(12) United States Patent
Pantin et al.

(10) Patent No.: US 10,270,934 B2
(45) Date of Patent: Apr. 23, 2019

(54) IMAGE PROCESSING APPARATUS AND IMAGE FORMING APPARATUS

(71) Applicant: KYOCERA Document Solutions Inc., Osaka (JP)

(72) Inventors: Carl Christian Ray Pantin, Osaka (JP); Earl John Abaquita, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 15/813,834

(22) Filed: Nov. 15, 2017

(65) Prior Publication Data
US 2018/0160009 A1 Jun. 7, 2018

(30) Foreign Application Priority Data

Dec. 1, 2016 (JP) .................. 2016-234161
Dec. 1, 2016 (JP) .................. 2016-234162

(51) Int. Cl.
*H04N 1/00* (2006.01)
*H04N 1/32* (2006.01)
(Continued)

(52) U.S. Cl.
CPC ..... *H04N 1/32122* (2013.01); *H04N 1/00129* (2013.01); *H04N 1/00233* (2013.01);
(Continued)

(58) Field of Classification Search
None
See application file for complete search history.

(56) References Cited

U.S. PATENT DOCUMENTS

| 7,496,832 B2 * | 2/2009 | Chen | G06F 17/243 |
| | | | 715/221 |
| 2002/0002565 A1 * | 1/2002 | Ohyama | G06F 3/04812 |
| | | | 715/246 |

(Continued)

FOREIGN PATENT DOCUMENTS

JP 2008-131381 A 6/2008

*Primary Examiner* — Beniyam Menberu
(74) *Attorney, Agent, or Firm* — IP Business Solutions, LLC

(57) ABSTRACT

An image processing apparatus includes: a display section; an image reading section; a rectangle extracting section that extracts a rectangle-representing image from a document image acquired from reading by the image reading section and detects a size and a location of the rectangle-representing image in the document image; an identification information assigning section that sequentially assigns a piece of identification information to the extracted rectangle-representing image; a display control section; an operation acceptance section; a box information creating section that associates the rectangle-representing image specified as a box the size and location of the rectangle-representing image in the document image, and the piece of identification information assigned to the rectangle-representing image with each other to create a piece of box information on the box; a storage section; and a control section that allows the storage section to store a template containing the document image and the piece of box information.

6 Claims, 19 Drawing Sheets

(51) Int. Cl.
  *G06F 3/12* (2006.01)
  *G06K 15/02* (2006.01)
(52) U.S. Cl.
  CPC ..... *H04N 1/00411* (2013.01); *H04N 1/32101* (2013.01); *G03G 2215/0458* (2013.01)

(56) References Cited

U.S. PATENT DOCUMENTS

| | | | | |
|---|---|---|---|---|
| 2003/0188260 | A1* | 10/2003 | Jensen | G06F 17/243 |
| | | | | 715/222 |
| 2006/0039606 | A1* | 2/2006 | Miyatake | G06K 9/00449 |
| | | | | 382/189 |
| 2009/0226090 | A1* | 9/2009 | Okita | G06K 9/00442 |
| | | | | 382/187 |
| 2013/0061124 | A1* | 3/2013 | Patton | G06F 17/243 |
| | | | | 715/224 |
| 2013/0236110 | A1* | 9/2013 | Barrus | G06K 9/00463 |
| | | | | 382/224 |
| 2013/0238966 | A1* | 9/2013 | Barrus | G06K 9/00449 |
| | | | | 715/223 |
| 2014/0372860 | A1* | 12/2014 | Craven | G06F 17/24 |
| | | | | 715/222 |
| 2016/0217119 | A1* | 7/2016 | Dakin | G06F 17/243 |
| 2017/0147552 | A1* | 5/2017 | Carroll | G06K 9/00449 |
| 2017/0177558 | A1* | 6/2017 | Maltz | G06F 17/245 |

* cited by examiner

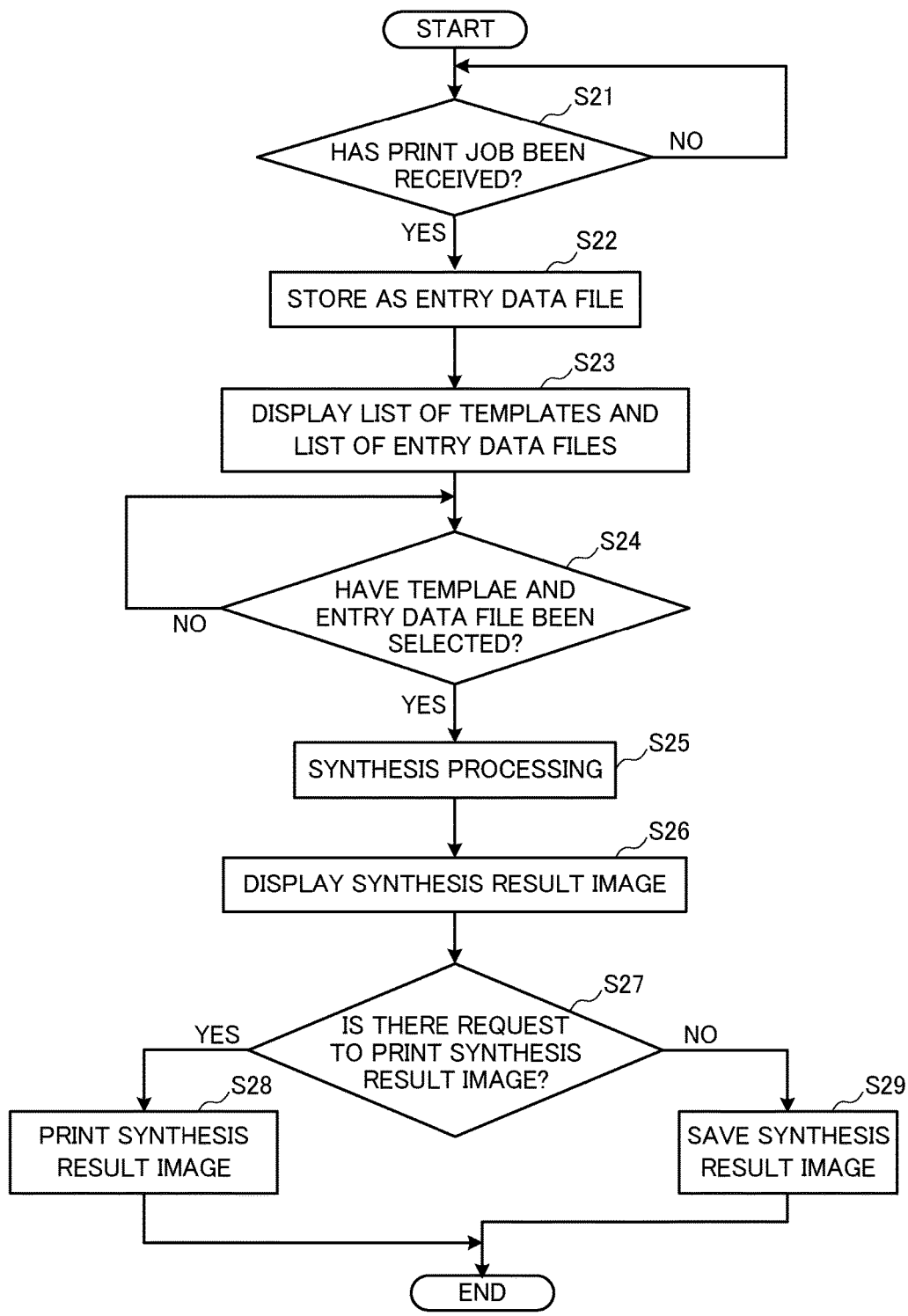

Fig.7

PAYMENT FORM

BIR FORM NO. 0605
JULY 1999 (ENCS)

FILL IN ALL APPLICABLE SPACES. MARK ALL APPROPRIATE BOXES WITH AN "X"

| 1 FOR ☐ CALENDAR ☐ FISCAL | 3 QUARTER ☐ 1ST ☐ 2ND ☐ 3RD ☐ 4TH | 4 DUE DATE | 5 NO. OF SHEETS ATTACHED | 6 ATC |
|---|---|---|---|---|
| 2 YEAR ENDED | | | | |

| 7 RETURN PERIOD | 8 TAX TYPE CODE | BCS NO./ITEM NO. |
|---|---|---|

PART I — BACKGROUND INFORMATION

| 9 TAXPAYER IDENTIFICATION NO. | 10 RDO CODE | 11 TAXPAYER CLASSIFICATION I N | 12 BUSINESS/OCCUPATION |
|---|---|---|---|

13 TAXPAYER'S NAME
(LAST NAME, FIRST NAME, MIDDLE NAME FOR INDIVIDUALS)/
(REGISTERED NAME FOR NON-INDIVIDUALS)

| 15 REGISTERED ADDRESS | 14 TEL NO. |
|---|---|
| | 16 ZIP CODE |

PAYMENT FORM

BIR FORM NO. 0605

JULY 1999 (ENCS)

FILL IN ALL APPLICABLE SPACES. MARK ALL APPROPRIATE BOXES WITH AN "X"

| 1 FOR ☐(1) CALENDAR ☒(2) FISCAL | 3 QUARTER ☐(5) ☐(6) ☐(7) ☐(8) 1ST 2ND 3RD 4TH | 4 DUE DATE (9) (10) (11) | 5 NO. OF SHEETS ATTACHED (12) | 6 ATC (13) |
|---|---|---|---|---|
| 2 YEAR ENDED (3) (4) | | | | |
| 7 RETURN PERIOD (14) (15) (16) | 8 TAX TYPE CODE 8 (17) | BCS NO./ITEM NO. (18) | | |

BACKGROUND INFORMATION

PART I

| 9 TAXPAYER IDENTIFICATION NO. (19) (20) (21) (22) | 10 RDO CODE (23) | 11 TAXPAYER CLASSIFICATION I (24) N (25) | 12 BUSINESS/OCCUPATION (26) |
|---|---|---|---|
| 13 TAXPAYER'S NAME (27) (LAST NAME, FIRST NAME, MIDDLE NAME FOR INDIVIDUALS)/ (REGISTERED NAME FOR NON-INDIVIDUALS) | | | 14 TEL NO. (28) |
| 15 REGISTERED ADDRESS (29) | | | 16 ZIP CODE (30) |

PAYMENT FORM

BIR FORM NO.
0605
JULY 1999 (ENCS)

FILL IN ALL APPLICABLE SPACES. MARK ALL APPROPRIATE BOXES WITH AN "X"

| 1 FOR [(1)] CALENDAR [(2)] FISCAL | 3 QUARTER [(5)] [(6)] [(7)] [(8)] 1ST 2ND 3RD 4TH | 4 DUE DATE (9) (10) (11) | 5 NO. OF SHEETS ATTACHED (12) | 6 ATC (13) |

2 YEAR ENDED (3) (4)

7 RETURN PERIOD (14) (15) (16)

8 TAX TYPE CODE 8 (17)

BCS NO./ITEM NO. (18)

PART I  BACKGROUND INFORMATION

9 TAXPAYER IDENTIFICATION NO. (19) (20) (21) (22)

10 RDO CODE (23)

11 TAXPAYER CLASSIFICATION I (24) N (25)

12 BUSINESS/OCCUPATION (26)

13 TAXPAYER'S NAME (27)
(LAST NAME, FIRST NAME, MIDDLE NAME FOR INDIVIDUALS)/
(REGISTERED NAME FOR NON-INDIVIDUALS)

14 TEL NO. (28)

15 REGISTERED ADDRESS (29)

16 ZIP CODE (30)

G1

12
- ENTER (12a)
- DELETE (12b)
- CONCATENATE (12c)
- CHECK (12d)
- SAVE (12e)
- CANCEL (12f)

Fig.10

| BOX INFORMATION | | |
|---|---|---|
| IDENTIFICATION INFORMATION | TYPE | LOCATION AND SIZE |
| (18) ------ | STANDARD BOX ------ | (a, b)、(c, d)、(e, f)、(g, h) ------ |

PAYMENT FORM | BIR FORM NO. 0605 JULY 1999 (ENCS)

FILL IN ALL APPLICABLE SPACES. MARK ALL APPROPRIATE BOXES WITH AN "X"

| 1 FOR [1] CALENDAR [2] FISCAL | 3 QUARTER [5] [6] [7] [8] 1ST 2ND 3RD 4TH | 4 DUE DATE (9) (10) (11) | 5 NO. OF SHEETS ATTACHED (12) | 6 ATC (13) |
|---|---|---|---|---|
| 2 YEAR ENDED (3) (4) | | | | |
| 7 RETURN PERIOD (14) (15) (16) | 8 TAX TYPE CODE 8 (17) | BCS NO./ITEM NO. (18) | | |

BACKGROUND INFORMATION

PART I
| 9 TAXPAYER IDENTIFICATION NO. (19) (20) (21) (22) | 10 RDO CODE (23) | 11 TAXPAYER CLASSIFICATION I (24) N (25) | 12 BUSINESS/OCCUPATION (26) |
|---|---|---|---|
| 13 TAXPAYER'S NAME 13 (27) (LAST NAME, FIRST NAME, MIDDLE NAME FOR INDIVIDUALS)/ (REGISTERED NAME FOR NON-INDIVIDUALS) | | | 14 TEL NO. (28) |
| 15 REGISTERED ADDRESS (29) | | | 16 ZIP CODE (30) |

12

BOX NO :18

HEIGHT 12g
12

WIDTH 12h
20

EXECUTE 12i

PAYMENT FORM | BIR FORM NO. 0605
JULY 1999 (ENCS)

FILL IN ALL APPLICABLE SPACES. MARK ALL APPROPRIATE BOXES WITH AN "X"

| 1 FOR [1] CALENDAR [2] FISCAL | 3 QUARTER | 4 DUE DATE | 5 NO. OF SHEETS | 6 ATC |
|---|---|---|---|---|
| 2 YEAR ENDED (3) (4) | [5] [6] [7] [8]<br>1ST 2ND 3RD 4TH | (9) (10) (11) | ATTACHED (12) | (13) |

| 7 RETURN PERIOD | 8 TAX TYPE CODE | BCS NO./ITEM NO. |
|---|---|---|
| (14) (15) (16) | 8 (17) | (18) |

PART I — BACKGROUND INFORMATION

| 9 TAXPAYER IDENTIFICATION NO. | 10 RDO CODE | 11 TAXPAYER CLASSIFICATION | 12 BUSINESS/OCCUPATION |
|---|---|---|---|
| (19) (20) (21) (22) | (23) | I (24) N (25) | (26) |

13 TAXPAYER'S NAME (27)
(LAST NAME, FIRST NAME, MIDDLE NAME FOR INDIVIDUALS)/
(REGISTERED NAME FOR NON-INDIVIDUALS)

14 TEL NO. (28)

15 REGISTERED ADDRESS (29)

16 ZIP CODE (30)

12 — 12a ENTER, 12b DELETE, 12c CONCATENATE, 12d CHECK, 12e SAVE, 12f CANCEL

Fig.13

PAYMENT FORM

BIR FORM NO.
0605
JULY 1999 (ENCS)

FILL IN ALL APPLICABLE SPACES. MARK ALL APPROPRIATE BOXES WITH AN "X"

| 1 FOR ① CALENDAR ② FISCAL | 3 QUARTER<br>⑤ ⑥ ⑦ ⑧<br>1ST 2ND 3RD 4TH | 4 DUE DATE<br>(9) (10) (11) | 5 NO. OF SHEETS | 6 ATC |
|---|---|---|---|---|
| 2 YEAR ENDED (4) | | | ATTACHED (12) | (13) |
| 7 RETURN PERIOD<br>7 (14) (15) (16) | 8 TAX TYPE CODE<br>8 (17) | BCS NO./ITEM NO.<br>(18) | | |

BACKGROUND INFORMATION

PART I

| 9 TAXPAYER IDENTIFICATION NO.<br>(19) (20) (21) (22) | 10 RDO CODE<br>(23) | 11 TAXPAYER CLASSIFICATION<br>I (24) N (25) | 12 BUSINESS/OCCUPATION<br>(26) |
|---|---|---|---|
| 13 TAXPAYER'S NAME (27)<br>(LAST NAME, FIRST NAME, MIDDLE NAME FOR INDIVIDUALS)/<br>(REGISTERED NAME FOR NON-INDIVIDUALS) | | | 14 TEL NO.<br>(28) |
| 15 REGISTERED ADDRESS (29) | | | 16 ZIP CODE (30) |

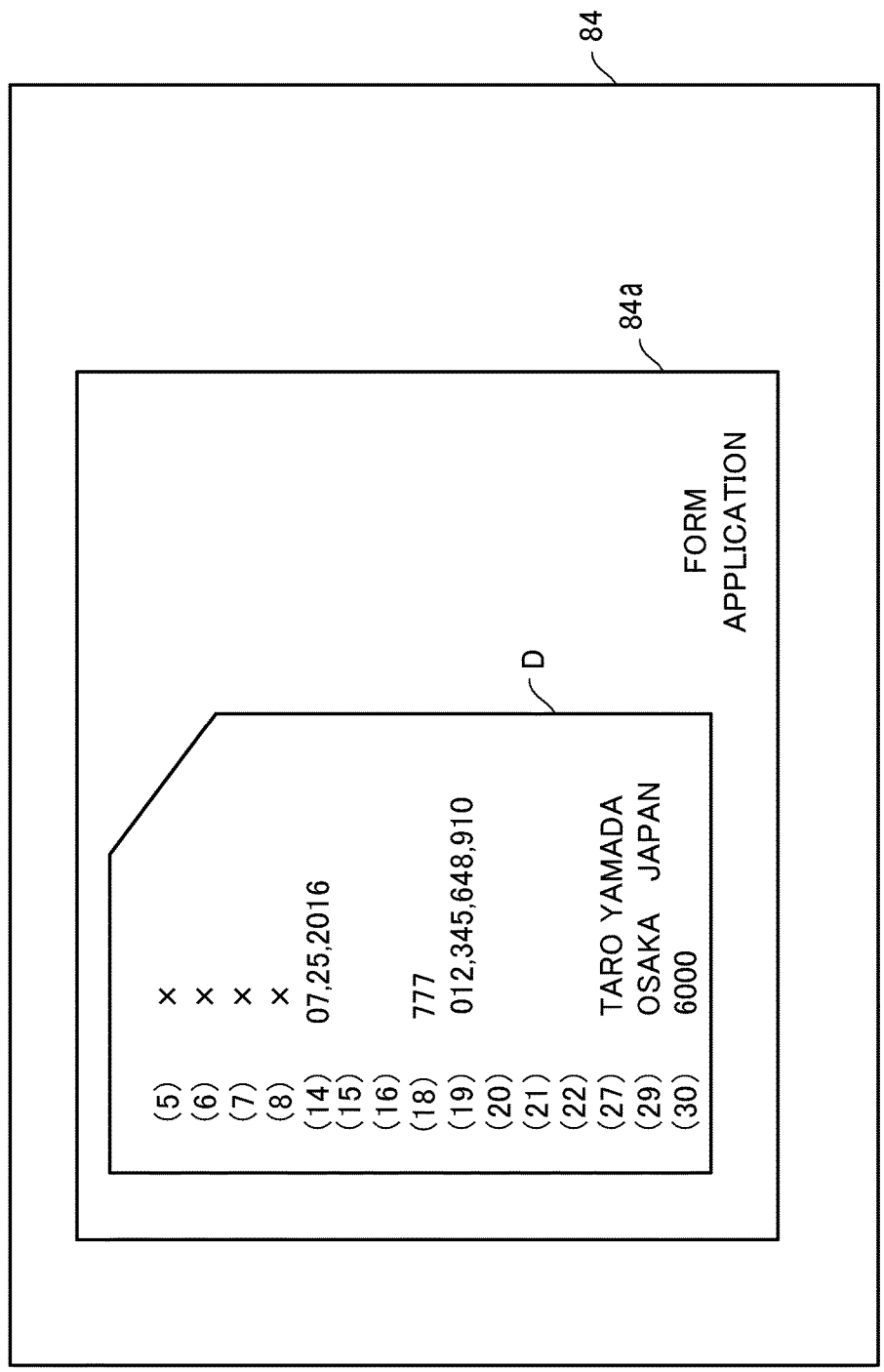

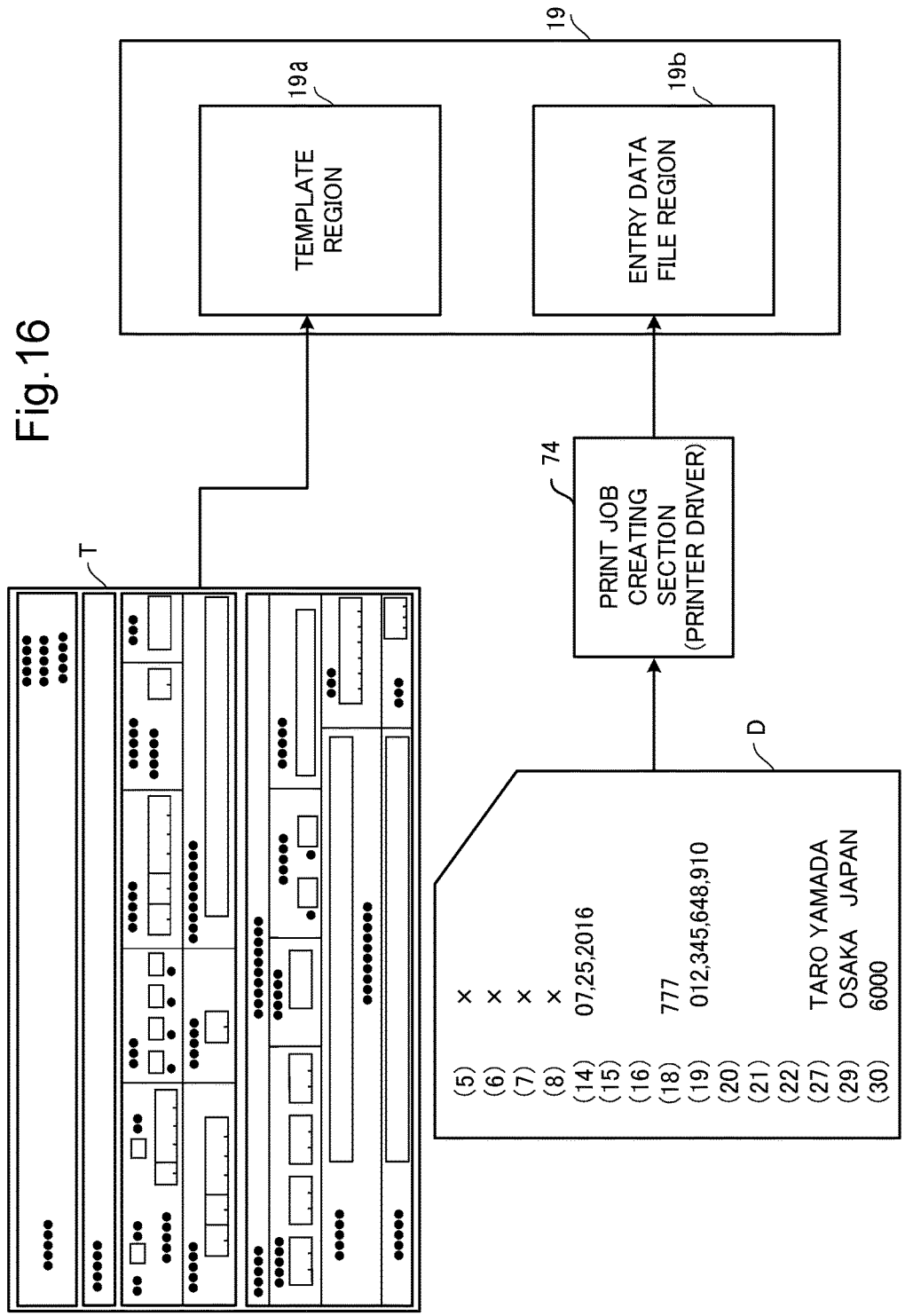

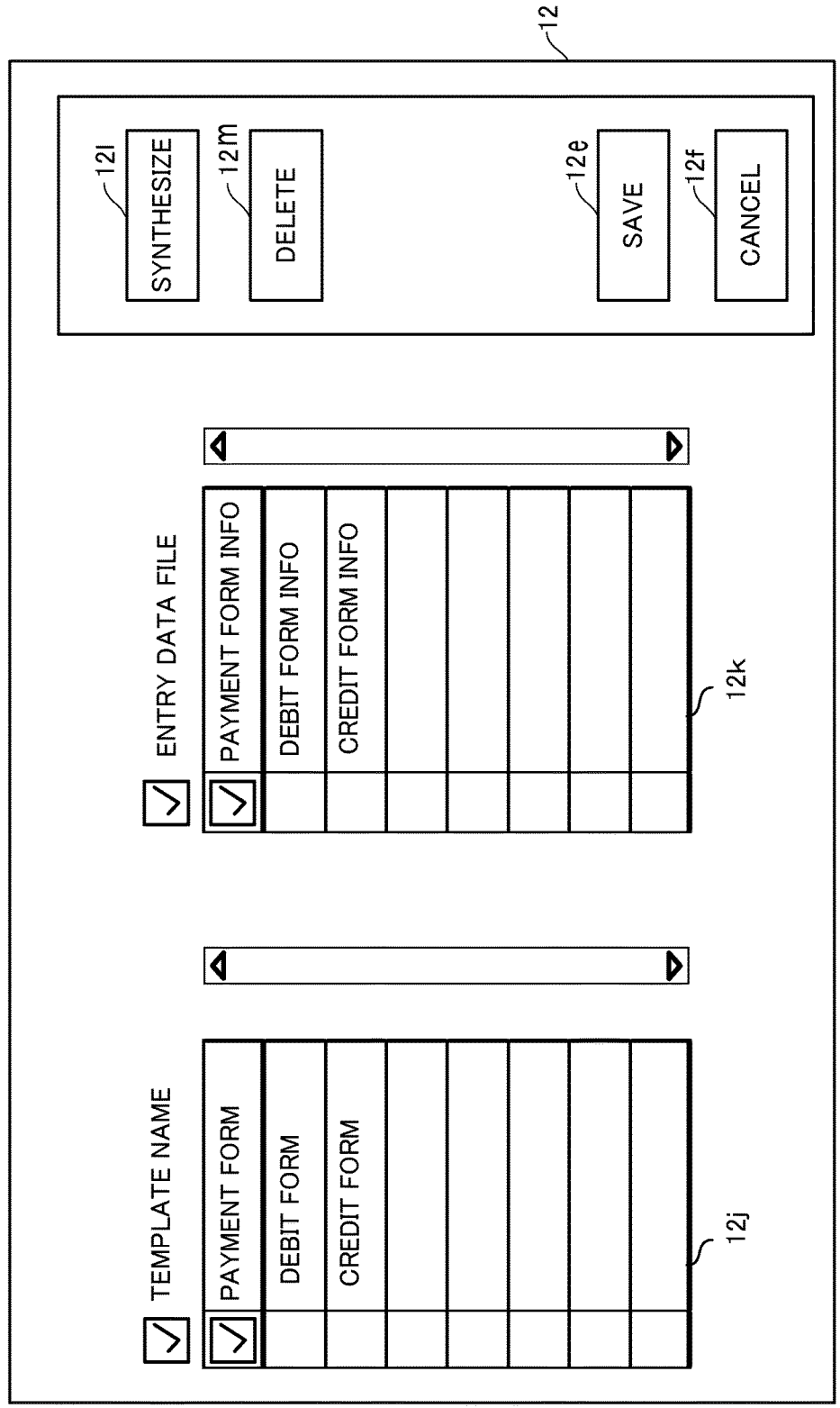

Fig.18

PAYMENT FORM

BIR FORM NO. 0605
JULY 1999 (ENCS)

FILL IN ALL APPLICABLE SPACES. MARK ALL APPROPRIATE BOXES WITH AN "X"

| 1 FOR [1] CALENDAR [2] FISCAL | 3 QUARTER | 4 DUE DATE | 5 NO. OF SHEETS ATTACHED | 6 ATC |
|---|---|---|---|---|
| 2 YEAR ENDED (3) (4) | (5) (6) (7) (8) 1ST 2ND 3RD 4TH | (9) (10) (11) | (12) | (13) |
| 7 RETURN PERIOD 7: (14)(15) (16) | 8 TAX TYPE CODE 8 (17) | BCS NO./ITEM NO. (18) | | |

BACKGROUND INFORMATION

PART I

| 9 TAXPAYER IDENTIFICATION NO. (19) (20) (21) (22) | 10 RDO CODE (23) | 11 TAXPAYER CLASSIFICATION I (24) N (25) | 12 BUSINESS/OCCUPATION (26) |
|---|---|---|---|

13 TAXPAYER'S NAME  13: (27)
(LAST NAME, FIRST NAME, MIDDLE NAME FOR INDIVIDUALS)/
(REGISTERED NAME FOR NON-INDIVIDUALS)

| 15 REGISTERED ADDRESS (29) | 14 TEL NO. (28) |
|---|---|
| | 16 ZIP CODE (30) |

T (PAYMENT FORM)

I (PAYMENT FORM INFO)

(5) ×
(6) ×
(7) ×
(8) ×
(14) 07,25,2016
(15)
(16)
(18) 777
(19) 012,345,648,910
(20)
(21)
(22)
(27) TARO YAMADA
(29) OSAKA JAPAN
(30) 6000

Fig.19

PAYMENT FORM

BIR FORM NO. 0605
JULY 1999 (ENCS)

FILL IN ALL APPLICABLE SPACES. MARK ALL APPROPRIATE BOXES WITH AN "X"

| 1 FOR ☐ CALENDAR ☐ FISCAL | 3 QUARTER ☒ ☒ ☒ ☒ 1ST 2ND 3RD 4TH | 4 DUE DATE | 5 NO. OF SHEETS ATTACHED | 6 ATC |
|---|---|---|---|---|
| 2 YEAR ENDED | | | | |

| 7 RETURN PERIOD 07 25 2 0 1 6 | 8 TAX TYPE CODE 8 | BCS NO./ITEM NO. |
|---|---|---|

PART I     BACKGROUND INFORMATION

| 9 TAXPAYER IDENTIFICATION NO. 0 1 2 3 4 5 6 7 8 9 1 0 | 10 RDO CODE | 11 TAXPAYER CLASSIFICATION I ☐ N ☒ | 12 BUSINESS/OCCUPATION |
|---|---|---|---|

| 13 TAXPAYER'S NAME | TARO YAMADA |
|---|---|
| | (LAST NAME, FIRST NAME, MIDDLE NAME FOR INDIVIDUALS)/ (REGISTERED NAME FOR NON-INDIVIDUALS) |

| 15 REGISTERED ADDRESS | OSAKA JAPAN | 14 TEL NO. | 16 ZIP CODE 6000 |
|---|---|---|---|

PRINT — 12n
SAVE — 12e
CANCEL — 12f

IMAGE PROCESSING APPARATUS AND IMAGE FORMING APPARATUS

INCORPORATION BY REFERENCE

This application claims priority to Japanese Patent Application No. 2016-234161 filed on 1 Dec. 2016 and No. 2016-234162 filed on 1 Dec. 2016, the entire disclosure of which are incorporated herein by reference.

BACKGROUND

The present disclosure relates to image processing apparatuses and image forming apparatuses and particularly relates to a technique for processing a read image of a document.

In an image forming apparatus, each of documents in predetermined formats in which necessary items are to be filled, for example, various types of notification forms, is scanned and image data, such as characters and ruled lines, representing the document read by scanning is stored as a template of the document in a storage section, such as an HDD. The image forming apparatus prints out, based on such a template, the image of the document (hereinafter, also referred to simply as the document image) on a recording medium.

Meanwhile, there is, as a general image processing apparatus, an apparatus in which in storing a template of a document, data on rectangle-representing images representing rectangles serving as entry fields in which necessary items are to be filled (entered) is acquired and stored. In addition, this image processing apparatus scans another document on which pieces of character data for entry are described, and allows a storage section to store, as a template of the another document, data on images of the pieces of character data for entry read by scanning and rectangle-representing images representing rectangles in which the pieces of character data for entry are to be entered. Furthermore, in relation to this image processing apparatus, a technique is proposed for automatically synthesizing, based on the data on the rectangle-representing images stored in the storage section, corresponding pieces of character data for entry within the areas of the rectangle-representing images.

SUMMARY

A technique improved over the aforementioned technique is proposed as one aspect of the present disclosure.

An image processing apparatus according to an aspect of the present disclosure includes a display section, an image reading section, a rectangle extracting section, an identification information assigning section, a display control section, an operation acceptance section, a box information creating section, a storage section, and a control section. The image reading section reads an image of a document. The rectangle extracting section extracts a rectangle-representing image representing a rectangle from the image of the document acquired from reading by the image reading section and detects a size and a location of the rectangle-representing image in the image of the document. The identification information assigning section sequentially assigns a piece of identification information to the rectangle-representing image extracted by the rectangle extracting section. The display control section allows the display section to display the image of the document and display on the image of the document the rectangle-representing image extracted by the rectangle extracting section. The operation acceptance section accepts an operating instruction from a user. When the operation acceptance section accepts a specification request from the user to specify the rectangle-representing image being displayed on the display section as a box that is an entry field in which a piece of character data for entry is to be entered, the box information creating section creates a piece of box information on the box by associating the rectangle-representing image specified as the box by the specification request, the size and location of the rectangle-representing image in the image of the document, and the piece of identification information assigned to the rectangle-representing image with each other. When the box information creating section creates the piece of box information, the control section allows the storage section to store the image of the document and the piece of box information in a form of a template containing the image of the document and the piece of box information.

An image forming apparatus according to another aspect of the present disclosure includes the above-described image processing apparatus and an image forming section that forms on a recording medium the image of the document acquired from reading by the image reading section.

An image processing apparatus according to still another aspect of the present disclosure is an image processing apparatus connected to an information processing apparatus via a network and includes a storage section, a communication section, an entry character data acquisition section, a control section, and an image processing section. The storage section stores an image of a document, a rectangle-representing image representing a rectangle contained in the image of the document and specified as a box serving as an entry field in which a piece of character data for entry is to be entered, and a piece of identification information assigned to the rectangle-representing image, in a form of a template containing the image of the document and a piece of box information on the box in which the rectangle-representing image and the piece of identification information are associated with each other. The communication section transfers data to and from the information processing apparatus via the network. The entry character data acquisition section acquires, through the communication section via the network from the information processing apparatus, the piece of character data for entry to be entered in the box and the piece of identification information associated with the piece of character data for entry. The control section allows the storage section to store as an entry data file the piece of character data for entry and the piece of identification information associated with the piece of character data for entry, both acquired by the entry character data acquisition section. The image processing section synthesizes, within an area of the rectangle-representing image that is present in the image of the document represented by the template and is specified as the box indicated by the piece of identification information contained in the template, the piece of character data for entry contained in the entry data file and associated with the same piece of identification information as the piece of identification information contained in the template to create a synthesis result image.

An image forming apparatus according to still another aspect of the present disclosure includes the above-described image processing apparatus and an image forming section that forms on a recording medium the synthesis result image created by the image processing section.

BRIEF DESCRIPTION OF THE DRAWINGS

FIG. 6 is a flowchart showing a flow of processing for creating a synthesis result image on the image forming apparatus.

FIG. 7 is a view showing an example of a document image acquired from reading by an image reading section.

FIG. 8 is a view showing a specific example of extracted rectangle-representing images and pieces of identification information assigned to the rectangle-representing images in the document image acquired from reading by the image reading section.

FIG. 9 is a view showing an example of a display screen displayed on a display section of the image forming apparatus.

FIG. 10 is a view showing a specific example of a piece of box information.

FIG. 11 is a view showing an example of another display screen displayed on the display section of the image forming apparatus.

FIG. 12 is a view showing an example of still another display screen displayed on the display section of the image forming apparatus.

FIG. 13 is a view showing an example of a display screen displayed on a display section of the PC.

FIG. 14 is a view showing a specific example of document data stored on an HDD of the PC.

FIG. 16 is a view showing specific examples of a template and an entry data file which are to be stored in a storage section of the image forming apparatus.

FIG. 17 is a view showing an example of still another display screen displayed on the display section of the image forming apparatus.

FIG. 18 is a view showing specific examples of a template and an entry data file which are to be synthesized together.

FIG. 19 is a view showing an example of still another display screen displayed on the display section of the image forming apparatus.

DETAILED DESCRIPTION

Figure 1:
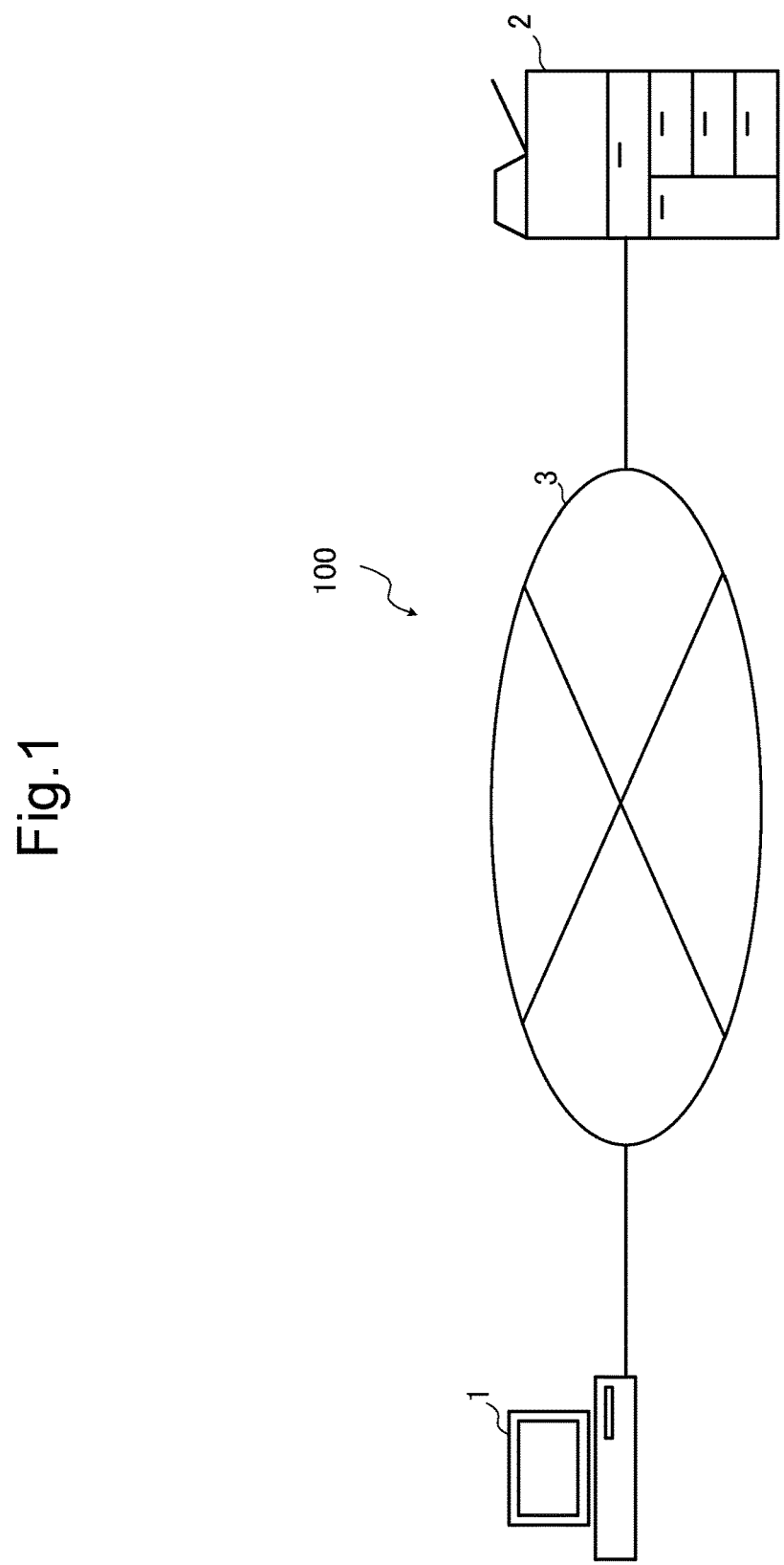
FIG. 1 is a view showing an entire image formation system in which an image forming apparatus according to one embodiment of the present disclosure is used.
Figure 2:
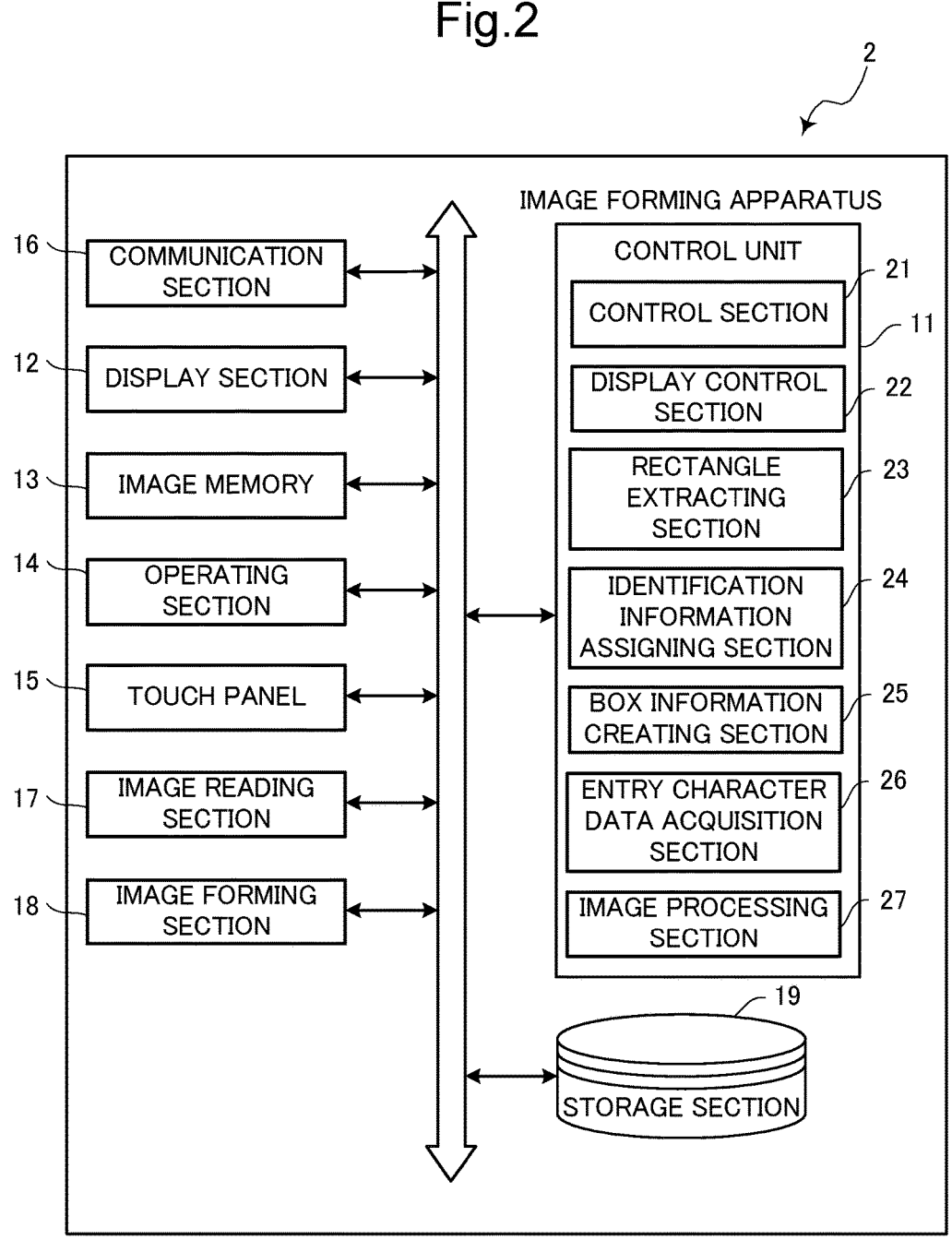
FIG. 2 is a functional block diagram showing the configuration of essential components of the image forming apparatus.
Figure 3:
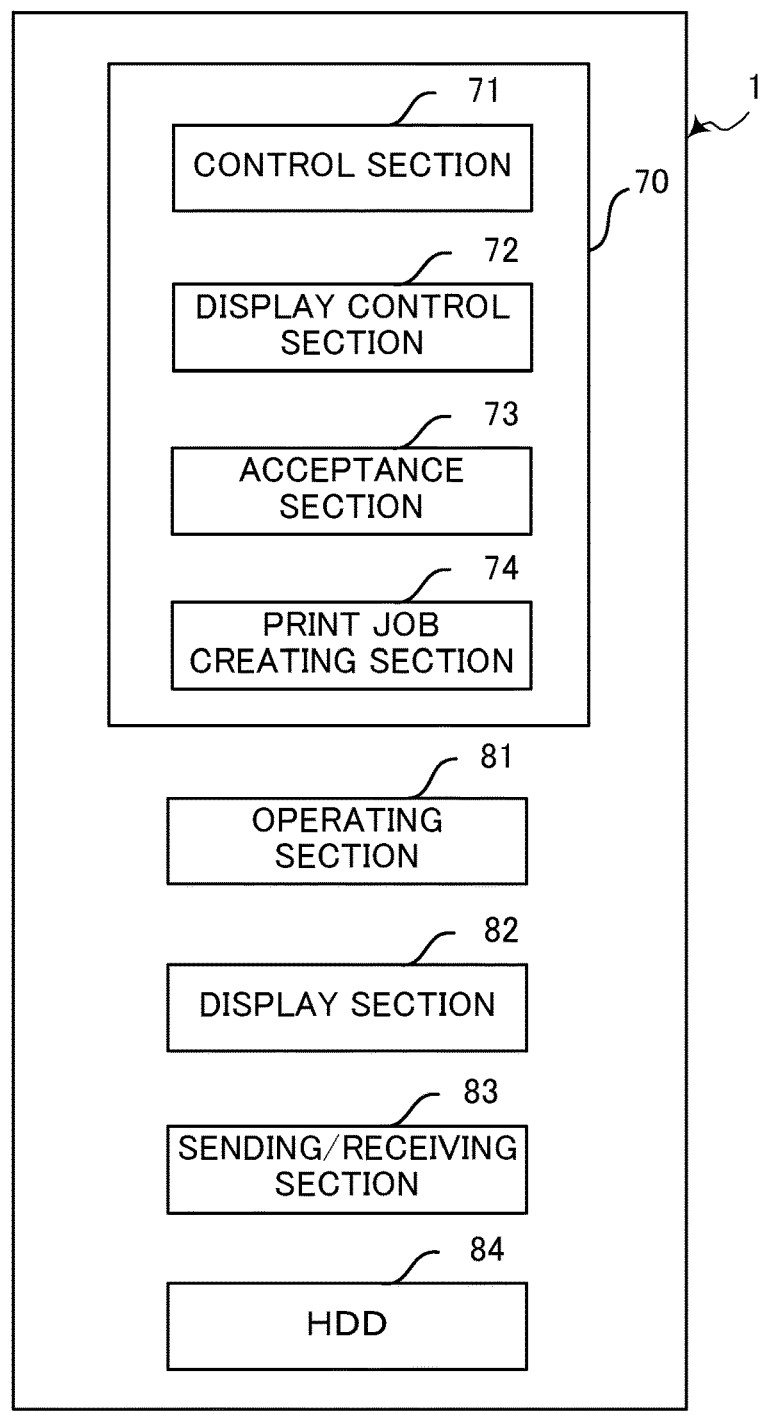
FIG. 3 is a functional block diagram showing the configuration of essential components of a PC.

Hereinafter, a description will be given of an embodiment of an image processing apparatus and an image forming apparatus, both according to the present disclosure, with reference to the drawings. FIG. 1 is a view showing an entire image formation system in which an image forming apparatus according to one embodiment of the present disclosure is used. FIG. 2 is a functional block diagram showing the configuration of essential components of the image forming apparatus. FIG. 3 is a functional block diagram showing the configuration of essential components of a PC.

The image formation system 100 includes a personal computer (hereinafter, referred to as a PC) 1 serving as an information processing apparatus and an image forming apparatus 2 serving as an image processing apparatus according to one embodiment of the present disclosure. The PC 1 and the image forming apparatus 2 are connected to each other via a network 3, such as the Internet or a LAN.

Furthermore, in the image formation system 100, according to an operating instruction from a user, a print job is sent from the PC 1 to the image forming apparatus 2 and print processing (image formation processing) using the print job is performed on the image forming apparatus 2. Moreover, in the image formation system 100, as will be hereinafter described in detail, pieces of character data for entry created on the PC 1 side are sent to the image forming apparatus 2 and the image forming apparatus 2 performs synthesis processing for synthesizing, within the areas of boxes associated with pieces of identification information described hereinafter (entry fields in which the pieces of character data for entry are to be entered), the pieces of character data for entry associated with the same pieces of identification information as the above pieces of identification information for the boxes.

The image forming apparatus 2 is an MFP (multifunction peripheral) having multiple functions including, for example, a copy function, a print function, a scan function, and a facsimile function. This image forming apparatus 2 includes a control unit 11, a display section 12, an image memory 13, an operating section 14, a touch panel 15, a communication section 16, an image reading section 17, an image forming section 18, and a storage section 19. These components are capable of transferring data or signals to and from one another via a bus.

The image reading section 17 includes a scanner that optically reads a document, creates image data representing a document image of the read document, and allows the image data to be stored in the image memory 13 or the storage section 19.

The image forming section 18 uniformly charges the surface of an unshown photosensitive drum, exposes the surface of the photosensitive drum to light to form an electrostatic latent image on the surface of the photosensitive drum, develops the electrostatic latent image on the surface of the photosensitive drum into a toner image, transfers the toner image (the image) on the surface of the photosensitive drum to a recording paper sheet through an intermediate transfer belt, fixes the toner image on the recording paper sheet, and discharges the recording paper sheet. For example, an image represented by the image data created by the image reading section 17 is printed on the recording paper sheet.

The display section 12 is formed of a display, such as a liquid crystal display (LCD) or an organic EL (light-emitting diode (OLED)) display.

The touch panel 15 is disposed on the screen of the display section 12. The touch panel 15 is a touch panel of, for example, a so-called resistive film system or a capacitance system and is capable of detecting a touch of the touch panel 15 with a user's finger or the like, together with the point of touch, and outputting a detection signal indicating the coordinate of the point of touch to a below-described control section 21 of the control unit 11 or the like. Therefore, the touch panel 15 serves as an operating section through which a user's operation made on the screen of the display section 12 is input.

The operating section 14 includes hard keys, such as a determination key and a start key.

The communication section 16 is a communication interface including a communication module.

The storage section 19 is a large storage device, such as an HDD (hard disk drive).

The control unit 11 is composed of a processor, a RAM (random access memory), a ROM (read only memory), and so on. The processor is, for example, a CPU (central processing unit), an MPU or an ASIC. When an image processing program stored in the above ROM or storage section 19 is executed by the above processor, the control unit 11 functions as a control section 21, a display control section 22, a rectangle extracting section 23, an identification information assigning section 24, a box information creating section 25, an entry character data acquisition section 26, and an image processing section 27. Alternatively, each of the control section 21, the display control section 22, the rectangle extracting section 23, and the identification information assigning section 24, the box information creating section 25, the entry character data acquisition section 26, and the image processing section 27 of the control unit 11 may not be implemented by the operation of the control unit 11 in accordance with the program but may be constituted by a hardware circuit.

The control section 21 governs the overall operation control of the image forming apparatus 1. The control section 21 has the function to accept, based on a detection signal output from the touch panel 15, a user's gesture on the touch panel 15. Furthermore, the control section 21 also has the function to accept a user's operation made on any hard key of the operating section 14. Note that the operating section 14 and the touch panel 15 are examples of the operation acceptance section defined in What is claimed is.

The control section 21 also has the function to control the communication operation of the communication section 16. The communication section 16 transfers, under the control of the control section 21, data to and from the PC 1 and so on via the network 3.

The display control section 22 controls the operation of the display section 12. The display control section 22 allows the display section 12 to display, for example, an entry screen for setting detailed items about boxes or the like used in synthesis processing and serving as entry fields in which pieces of character data for entry are to be entered, an entry screen for information, and operation guidance of the image forming apparatus 2.

The rectangle extracting section 23 uses a predetermined rectangle-representing image representing a rectangle and stored in the storage section 19 or the like to perform pattern matching with a document image acquired from reading by the image reading section 17, thus extracting one or more rectangle-representing images representing rectangles (quadrangles including square and other types of rectangles) from the document image. Furthermore, the rectangle extracting section 23 detects, based on the coordinate points of each of the rectangle-representing images in the document image, the size and location of the rectangle-representing image. The extracted rectangle-representing image is used as a box described above according to an operating instruction from the user as will be hereinafter described in detail.

The image processing section 27 is operable to, when the user specifies the rectangle-representing image as a box, i.e., as an entry field in which a piece of character data for entry is to be entered, enter (synthesize) a piece of character data for entry within the area of the box based on the size and location of the box in the document image. Thus, the piece of character data for entry to be entered can be surely entered in the entry field (box).

The identification information assigning section 24 sequentially assigns individual pieces of identification information to the rectangle-representing images extracted by the rectangle extracting section 23.

When the identification information assigning section 24 sequentially assigns the pieces of identification information to the extracted rectangle-representing images, the control section 21 associates each of the rectangle-representing images extracted by the rectangle extracting section 23, the size and location of the rectangle-representing image in the document image, which have been detected by the rectangle extracting section 23, and the piece of identification information assigned to the rectangle-representing image with each other and allows the storage section 19 to store the associated set of the rectangle-representing image, the size and location thereof, and the piece of identification information. Furthermore, in allowing the display section 12 to display the document image acquired from reading by the image reading section 17, the display control section 22 allows the display section 12 to display the document image in which the associated pieces of identification information are superimposed on the rectangle-representing images extracted by the rectangle extracting section 23.

The box information creating section 25 is operable to, when the above operation acceptance section (the operating section 14 and the touch panel 15) accepts a specification request from the user to specify a rectangle-representing image being displayed on the display section 12 as a box that is an entry field in which a piece of character data for entry is to be entered, create a piece of box information on the box by associating the rectangle-representing image specified as the box by the specification request with the piece of identification information assigned to the rectangle-representing image. The piece of box information also contains the size and location, in the document image, of the rectangle-representing image specified as the box by the specification request.

Furthermore, when the above operation acceptance section accepts, in addition to the above specification request, a selection request from the user to select, as a type of the box specified by the specification request, one of (i) a standard box in which at least one character is to be entered as the piece of character data for entry, (ii) a concatenated box in which a plurality of boxes each capable of accommodating the piece of character data for entry are concatenated as a single box, and (iii) a check box in which a predetermined check mark is to be entered as the piece of character data for entry, the box information creating section 25 creates a piece of box information on the box by associating the rectangle-representing image specified as the box by the specification request, the size and location of the rectangle-representing image in the document image, the piece of identification information assigned to the rectangle-representing image, and the type of the box selected by the selection request with each other.

Moreover, when the box information creating section 25 creates such a piece of box information, the display control section 22 allows the display section 12 to display, upon display of the document image, the box in a different display manner depending on the type of box.

When the box information creating section 25 creates the piece or pieces of box information, the control section 21 allows the storage section 19 to store the document image acquired from reading by the image reading section 17 and the piece(s) of box information in a form of a template containing the document image and the piece(s) of box information. Furthermore, the control section 21 allows the communication section 16 to send the template of the document image stored in the storage section 19 and an instruction signal to the PC 1 via the network 3. The instruction signal is a signal that instructs the display section 82 of the PC 1 to display an entry screen in which the rectangle-representing images specified as the boxes are associated with the respective pieces of identification information assigned to the rectangle-representing images and the rectangle-representing images and the pieces of identification information are superimposed on the document image represented by the template.

Moreover, in allowing the communication section 16 to send the template of the document image stored in the storage section 19 to the PC 1 via the network 3, the control section 21 allows the communication section 16 to send to the PC 1, together with the instruction signal, the template containing images of the boxes the display manners of which are different depending on the type of box, thus allowing the display section 82 of the PC 1 to display the template as an entry screen.

After the operation acceptance section (the operating section 14 and the touch panel 15) accepts a specification request from the user to specify a box, the display control section 22 allows the display section 12 to display an image for accepting a change in size of the box, i.e., changes of height and width values of the box, from the user. Since in this manner the display control section 22 allows the display section 12 to display the image enabling the height and width values of the box to be changed upon acceptance of a change in size of the box from the user, the user can easily designate a box having a desired size.

Then, when the operation acceptance section (the operating section 14 and the touch panel 15) accepts a change instruction to change a box size by the input of values designating the box size, the control section 21 allows the storage section 19 to store the size indicated by the accepted change instruction as the size, in the document image, of the rectangle-representing image specified as the box, in a form of inclusion in the piece of box information.

The entry character data acquisition section 26 acquires, through the communication section 16 via the network 3 from the PC 1, pieces of character data for entry to be entered in the respective boxes and the pieces of identification information associated with the respective pieces of character data for entry.

When the entry character data acquisition section 26 acquires the pieces of character data for entry and the associated pieces of identification information, the control section 21 allows the storage section 19 to store the acquired pieces of character data for entry and pieces of identification information as an entry data file. The storage section 19 is sufficient to store at least one above-described template, but in this embodiment the storage section 19 stores a plurality of templates. Furthermore, the storage section 19 is sufficient to store at least one above-described entry data file, but in this embodiment the storage section 19 stores a plurality of entry data files. Thus, the display control section 22 allows the display section 12 to display a list of templates stored in the storage section 19 and a list of entry data files stored in the storage section 19.

The image processing section 27 does various types of image processing of image data in the image memory 13, such as a document image acquired from reading of a document by the image reading section 17. Furthermore, the image processing section 27 synthesizes the rectangle-representing image specified as the box by the above specification request with a piece of character data for entry contained in an entry data file stored in the storage section 19. For example, the image processing section 27 synthesizes, within the area of a box in a document image represented by a template, a piece of character data for entry contained in an entry data file and associated with the same piece of identification information as the piece of identification information assigned to the box to create a synthesis result image.

Moreover, when the display control section 22 allows the display section 12 to display the list of templates and the list of entry data files and the operation acceptance section accepts, based on a user's operating instruction, an instruction to specify one template selected from among the list of templates and one entry data file selected from among the list of entry data files, the image processing section 27 synthesizes, within the areas of rectangle-representing images that are present in the document image represented by the selected one template and are specified as the boxes indicated by the pieces of identification information contained in the selected template, pieces of character data for entry contained in the selected one entry data file and associated with the same pieces of identification information as the pieces of identification information contained in the selected template to create a synthesis result image.

Furthermore, the display control section 22 allows the display section 12 to display the synthesis result image created by the image processing section 27.

The PC 1 includes a control unit 70, an operating section 81, a display section 82, a sending/receiving section 83, and an HDD 84. These components are capable of transferring data or signals to and from one another via a CPU bus.

The operating section 81 includes a keyboard, a mouse or a touch panel, through which a print instruction to specify print data to be printed (print job) and an image forming apparatus 2 to be used for the print job or like instruction is input to the operating section 81 by the user.

The display section 82 is formed of a display, such as an LCD (liquid crystal display) and displays operation guidance and so on for the user.

The sending/receiving section 83 is composed of a communication module, such as a LAN board, and sends and receives various data and signals to and from the image forming apparatus 2 via the network 3 connected to the sending/receiving section 83. The sending/receiving section 83 receives a template of a document image from the image forming apparatus 2.

The control unit 70 is composed of a processor, a RAM (random access memory), a ROM (read only memory), and so on. The processor is, for example, a CPU (central processing unit), an MPU or an ASIC. When an entry character data generation program stored on the above HDD 84 or the like is executed by the above processor, the control unit 70 functions as a control section 71, a display control section 72, an acceptance section 73, and a print job creating section 74. Alternatively, each of the control section 71, the display control section 72, and the acceptance section 73, and the print job creating section 74 of the control unit 70 may not be implemented by the operation of the control unit 70 in accordance with the entry character data generation program but may be constituted by a hardware circuit. Hereinafter, the same applied to the other embodiments unless otherwise stated.

The control section 71 governs the overall operation control of the PC 1.

The display control section 72 controls the operation of the display section 82. Furthermore, the display control section 72 performs, according to an instruction signal accepted by the acceptance section 73, a control for allowing the display section 82 to display an entry screen described hereinafter and other controls.

The acceptance section 73 accepts the instruction signal that instructs the manner of displaying the template on the display section 82, through the sending/receiving section 83 from the image forming apparatus 2 (as will be hereinafter described in detail).

Furthermore, the control section 71 reads out, according to a user's operation of the operating section 81, document data stored on the HDD 84 or document data from the outside of the PC 1, for example, a USB memory connected to a USB port of the PC 1.

The document data is data that is created by an application running on the PC 1, such as a word processor, and contains characters, for example, Japanese characters including hiragana and kanji, alphabetical letters, numerals, special characters including an at mark and a postal mark.

The print job creating section 74 creates a print job from the document data read out by the control section 71. For example, the print job creating section 74 operates according to a printer driver stored on the HDD 84 to convert the document data to a format written by a printer language suitable for the image forming apparatus 2, thus generating print data (for example, a PRN file), and create a print job for print processing containing the print data. The print job contains the print data (i.e., pieces of character data for entry converted to the above format) and pieces of identification information associated with the pieces character data for entry (as will be hereinafter described in detail).

Figure 4:
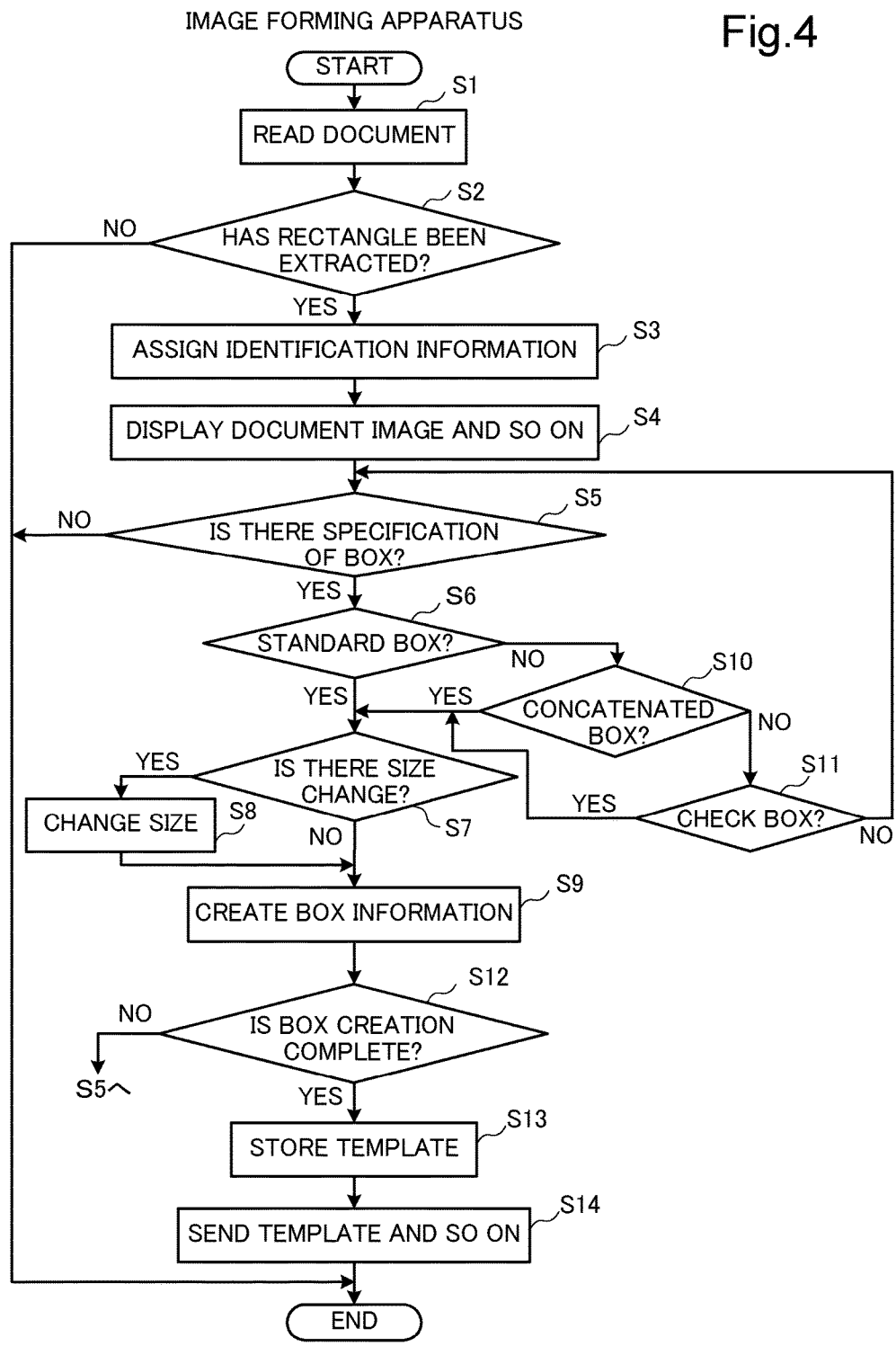
FIG. 4 is a flowchart showing a flow of processing for creating a template of a document image on the image forming apparatus.
Figure 5:
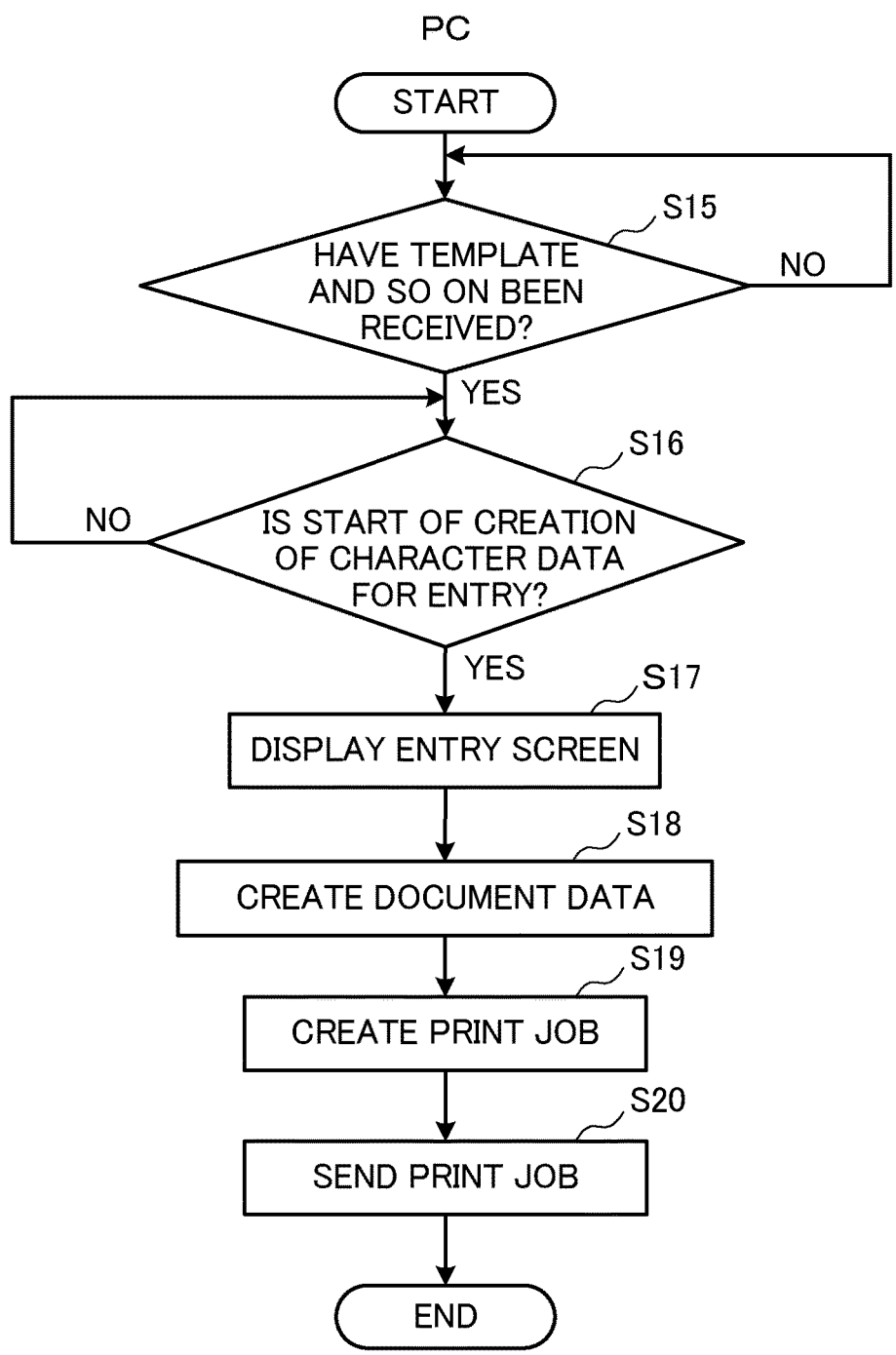
FIG. 5 is a flowchart showing a flow of processing on the PC.

A detailed description will be given below of the operation of the image formation system 100 having the above configuration with reference to FIGS. 4 to 6. FIG. 4 is a flowchart showing a flow of processing for creating a template of a document image on the image forming apparatus. FIG. 5 is a flowchart showing a flow of processing on the PC. FIG. 6 is a flowchart showing a flow of processing for creating a synthesis result image on the image forming apparatus.

First, when in the image forming apparatus 2 the user places a document G shown in FIG. 7 in the image reading section 17 and operates the start key of the operating section 14, an instruction to read the document is thus accepted by the control section 21 and the control section 21 allows the image reading section 17 to read an image of the document G and allows the image memory 13 to store image data (a document image G1) representing the read image of the document G (step S1).

Subsequently, the rectangle extracting section 23 extracts rectangle-representing images representing rectangles from the document image G1 of the document G acquired by the reading (step S2). Furthermore, in conjunction with extraction of the rectangle-representing images from the document image G1, the rectangle extracting section 23 detects the size and location of each rectangle-representing image in the document image G1.

In doing so, when the rectangle extracting section 23 can extract no rectangle-representing image from the document image G1 (NO in step S2), the processing ends.

On the other hand, when the rectangle extracting section 23 can extract at least one rectangle-representing image from the document image G1 (YES in step S2), the identification information assigning section 24 sequentially assigns individual pieces of identification information to the rectangle-representing images extracted by the rectangle extracting section 23 (step S3). For example, when thirty rectangle-representing images are extracted from the document image G1 by the rectangle extracting section 23, as shown in FIG. 8, the identification information assigning section 24 assigns, according to the order of extraction, individual pieces of identification information (1) to (30) to corresponding locations of the thirty rectangle-representing images in the document image G1.

Furthermore, as shown in FIG. 9, the display control section 22 allows the display section 12 to display the document image G1 acquired from reading by the image reading section 17 and display rectangle-representing images contained in a template stored in the storage section 19 and the pieces of identification information assigned to these rectangle-representing images by superimposing them on the document image G1 (step S4).

Subsequently, the control section 21 determines whether or not the touch panel (operation acceptance section) 15 has accepted a specification request to specify a rectangle-representing image in the document image G1 as the box (step S5). For example, when the user taps, on the display screen (entry screen) shown in FIG. 9, a portion displaying a rectangle-representing image to be specified as a box and the touch panel 15 detects the user's tap, the control section 21 determines that the specification request has been accepted. When the control section 21 determines that no specification request has been accepted, the processing ends (NO in step S5).

An alternative to the above may be configured so that, in a user's specification of a rectangle-representing image as a box, the user taps on, of unshown numeric keys provided on the operating section 14, a numeric key or keys corresponding to the piece of identification information assigned to the rectangle-representing image, an instruction to specify the number is thus input, and the control section 21 determines the rectangle-representing image having the same number as the input number to be a specified box.

On the other hand, when the control section 21 determines that a specification request has been accepted (YES in step S5), the control section 21 determines whether or not the type of the box specified by the specification request has been selected by the user. For example, when the touch panel 15 detects that an Enter key 12a has been tapped by the user, a portion displaying a rectangle-representing image to be specified as a standard box has subsequently been tapped by the user, and a Save key 12e has been then tapped by the user, the control section 21 determines that a selection request to select the box as a standard box has been accepted (step S6). When, after the acceptance of the specification request, a Cancel key 12f is tapped by the user and the touch panel 15 detects the tap, the control section 21 determines that the specification request in step S5 has been cancelled.

When determining that the selection request to select the box as a standard box has been accepted (YES in step S6), the control section 21 determines whether or not an instruction to specify the size of the standard box has been entered (step S7). For example, when, after the acceptance of the selection request to select the box as a standard box, the touch panel 15 detects that the portion displaying the rectangle-representing image specified as the standard box has been tapped by the user, the control section 21 accepts an instruction to specify the size of the standard box (i.e., the area of the entry field).

When the control section 21 determines that no instruction to specify the size of the standard box has been entered (NO in step S7), for example, when the touch panel 15 does not detect that the portion displaying the rectangle-representing image specified as the standard box has been tapped by the user within a predetermined period of time after the tap on the Save key 12e, the box information creating section 25 creates a piece of box information (step S9).

Specifically, the box information creating section 25 creates a piece of box information on the box by associating the size and location, in the document image G1, of the rectangle-representing image specified as the box by the specification request in step S5, the piece of identification information assigned to the rectangle-representing image, and the type of the box selected by the selection request with each other.

For example, as shown in FIG. 9, when four rectangle-representing images to which individual pieces of identification information (18), (27), (29), and (30) are assigned are selected as standard boxes, the box information creating section 25 creates respective pieces of box information on the four boxes by associating the size and location of each rectangle-representing image in the document image G1, the corresponding piece of identification information assigned to the rectangle-representing image, and a piece of information indicating that the box is a standard box with each other. Then, the control section 21 allows the storage section 19 to store these pieces of box information as a template. The size and location of the rectangle-representing image in the document image G1 are defined by an (x, y) coordinate system where an arbitrary coordinate point (for example, the highest and leftmost point) on the document image G1 having a rectangular shape is given as (0, 0). Thus, for example, as shown in FIG. 10, the storage section 19 stores, as a piece of box information, a piece of identification information assigned to a rectangle-representing image specified as a box, the type of the box, and the positions of four points (coordinate values at four points) of the rectangle-representing image, the positions indicating the size and location of the rectangle-representing image in the document image G1.

On the other hand, when the control section 21 determines that an instruction to specify the size of the standard box has been accepted (YES in step S7), the display control section 22 allows the display section 12 to display a display screen shown in FIG. 11. For example, when, after the rectangle-representing image to which the piece of identification information (18) is assigned is selected as a standard box, the control section 21 accepts a change in size of the standard box, as shown as an example in FIG. 11, the display control section 22 allows the display section 12 to display a height entry key 12g and a width entry key 12h for use in entering post-change height and width, respectively. Then, the user operates the unshown numeric keys of the touch panel 15 or the operating section 14 to enter desired height and width values. Thus, the entered height and width values are accepted as post-change height and width by the control section 21. The display control section 22 allows the display of the accepted height and width within the fields of the height entry key 12g and width entry key 12h, respectively, as shown in FIG. 11. Furthermore, when an Execute key 12i is tapped by the user and the touch panel 15 detects the tap, the display control section 22 allows the display section 12 to display the display screen shown in FIG. 9.

An alternative to the above may be configured so that when, after the desired height and width values of the standard box are entered, the Save key 12e is tapped by the user and the touch panel 15 detects the tap, the control section 21 accepts the entered height and width values as post-change height and width of the standard box. Alternatively, in place of user's entry of desired height and width values using the numeric keys and the like, the control section 21 may accept a change in size of the standard box when the user drags the rectangle-representing image selected as the standard box on the touch panel 15 to change the size of the image.

Then, when the Save key 12e is tapped by the user and the touch panel 15 detects the tap, the box information creating section 25 allows the storage section 19 to store the accepted values of post-change height and width as the size of the rectangle-representing image to which the piece of identification information (18) is assigned, in a form of inclusion in the piece of box information on the box corresponding to the rectangle-representing image to which the piece of identification information (18) is assigned.

When the control section 21 determines that no selection request to specify the box as a standard box has been accepted (NO in step S6), the control section 21 determines whether or not a selection request to specify the box as a concatenated box has been accepted (step S10). For example, when the touch panel 15 detects that the Enter key 12a has been tapped by the user, portions displaying rectangle-representing images to be specified as a concatenated box have subsequently been tapped by the user, and a Concatenate key 12c has been then tapped by the user, the control section 21 determines that a selection request to specify the box as a concatenated box has been accepted.

When determining that the selection request to specify the box as a concatenated box has been accepted (YES in step S10), the control section 21 determines whether or not an instruction to specify the size of the concatenated box has been entered (step S7). For example, when, after the acceptance of the selection request to specify the box as a concatenated box, the touch panel 15 detects that a portion displaying a rectangle-representing image specified as the concatenated box has been tapped by the user, the control section 21 accepts an instruction to specify the size of the concatenated box (i.e., the area of the entry field).

When the control section 21 determines that no instruction to specify the size of the concatenated box has been accepted (NO in step S7), for example, when the touch panel 15 does not detect that the portion displaying the rectangle-representing image specified as the concatenated box has been tapped by the user within a predetermined period of time after the tap of the Concatenate key 12c, the box information creating section 25 creates a piece of box information (step S9).

For example, when three rectangle-representing images to which individual pieces of identification information (14), (15), and (16) shown in FIG. 9 are assigned are selected as a concatenated box, the box information creating section 25 creates a piece of box information indicating that these three rectangle-representing images form a single concatenated box in which the size and location of each of the three rectangle-representing images in the document image G1 and the corresponding piece of identification information assigned to the rectangle-representing image are associated with each other. This piece of box information contains a piece of information indicating that the three rectangle-representing images to which the individual pieces of identification information (14), (15), and (16) are assigned are sub-boxes into each of which a piece of character data for entry can be entered independently of the other sub-boxes.

For another example, when four rectangle-representing images to which individual pieces of identification information (19), (20), (21), and (22) are assigned are selected as a concatenated box, the box information creating section 25 creates a piece of box information indicating that these four rectangle-representing images form a single concatenated box in which the size and location of each of the four rectangle-representing images in the document image G1 and the corresponding piece of identification information assigned to the rectangle-representing image are associated with each other. This piece of box information contains a piece of information indicating that the four rectangle-representing images to which the individual pieces of identification information (19), (20), (21) and (22) are assigned are such sub-boxes as above. Then, the box information creating section 25 allows the storage section 19 to store these pieces of box information as a template.

On the other hand, when the control section 21 determines that an instruction to specify the size of the concatenated box has been accepted (YES in step S7), the display control section 22 allows the display section 12 to display the display screen shown in FIG. 11. For example, when, after the rectangle-representing images to which the pieces of identification information (14), (15), and (16) are assigned are selected as a concatenated box, the control section 21 accepts an instruction to specify the size of the concatenated box, as shown as an example in FIG. 11, the display control section 22 allows the display section 12 to display the height entry key 12g and the width entry key 12h for use in entering post-change height and width, respectively. Then, the user operates the unshown numeric keys of the touch panel 15 or the operating section 14 to enter desired height and width values. Thus, the entered height and width values are accepted as post-change height and width by the control section 21. The display control section 22 allows the display of the accepted height and width within the fields of the height entry key 12g and width entry key 12h, respectively, as shown in FIG. 11. Furthermore, when the Execute key 12i is tapped by the user and the touch panel 15 detects the tap, the display control section 22 allows the display section 12 to display the display screen shown in FIG. 9. Then, when the control section 21 detects that the Save key 12e has been tapped, the box information creating section 25 allows the storage section 19 to store the accepted values of post-change height and width as the size of the rectangle-representing image representing a single rectangle formed by concatenating the three rectangles (rectangle-representing images) to which the pieces of identification information (14), (15), and (16) are assigned, in a form of inclusion in the piece of box information on the concatenated box representing the rectangles to which the pieces of identification information (14), (15) and (16) are assigned.

An alternative to the above may be configured so that when, after the desired height and width values of the concatenated box are entered, the Save key 12e is tapped by the user and the touch panel 15 detects the tap, the control section 21 accepts the entered height and width values as post-change height and width of the concatenated box. Alternatively, in place of user's entry of desired height and width values using the numeric keys and the like, the control section 21 may accept a change in size of the concatenated box when the user drags the rectangle-representing image selected as the concatenated box on the touch panel 15 to change the size of the image.

When the control section 21 determines that no selection request to specify the box as a concatenated box has been accepted (NO in step S10), the control section 21 determines whether or not a selection request to specify the box as a check box has been accepted (step S11). For example, when the touch panel 15 detects that the Enter key 12a has been tapped by the user, a portion displaying a rectangle-representing image to be specified as a check box has subsequently been tapped by the user, and a Check key 12d has been then tapped by the user, the control section 21 determines that a selection request to specify the box as a check box has been accepted.

When determining that the selection request to specify the box as a check box has been accepted (YES in step S11), the control section 21 determines whether or not an instruction to specify the size of the check box has been accepted (step S7). For example, when, after the acceptance of the selection request to specify the box as a check box, the touch panel 15 detects that the portion displaying the rectangle-representing image specified as the check box has been tapped by the user, the control section 21 accepts an instruction to specify the size of the check box (i.e., the area of the entry field).

When the control section 21 determines that no instruction to specify the size of the check box has been accepted (NO in step S7), for example, when the touch panel 15 does not detect that the portion displaying the rectangle-representing image specified as the check box has been tapped by the user within a predetermined period of time after the tap of the Check key 12d, the box information creating section 25 creates a piece of box information (step S9).

For example, when four rectangle-representing images to which individual pieces of identification information (5), (6), (7), and (8) shown in FIG. 9 are assigned are selected as check boxes, the box information creating section 25 creates respective pieces of box information on the four boxes by associating the size and location of each rectangle-representing image in the document image G1, the corresponding piece of identification information assigned to the rectangle-representing image, and a piece of information indicating that the box is a check box with each other. Then, as will be described hereinafter, the box information creating section 25 allows the storage section 19 to store these pieces of box information as a template.

On the other hand, when the control section 21 determines that an instruction to specify the size of the check box has been accepted (YES in step S7), the display control section 22 allows the display section 12 to display the display screen shown in FIG. 11. For example, when, after the rectangle-representing image to which the piece of identification information (5) is assigned is selected as a check box, the control section 21 accepts a change in size of the check box, as shown as an example in FIG. 11, the display control section 22 allows the display section 12 to display the height entry key 12g and the width entry key 12h for use in entering post-change height and width, respectively.

Then, the user operates the unshown numeric keys of the touch panel 15 or the operating section 14 to enter desired height and width values. Thus, the entered height and width values are accepted as post-change height and width by the control section 21. The display control section 22 allows the display of the accepted height and width within the fields of the height entry key 12g and width entry key 129h, respectively, as shown in FIG. 11. Furthermore, when the Execute key 12i is tapped by the user and the touch panel 15 detects the tap, the display control section 22 allows the display section 12 to display the display screen shown in FIG. 9. Then, when the control section 21 detects that the Save key 12e has been tapped, the box information creating section 25 treats the accepted values of post-change height and width as the size of the rectangle-representing image to which the piece of identification information (5) is assigned, and allows the storage section 19 to store the accepted values of post-change height and width in a form of inclusion in the piece of box information on the check box corresponding to the rectangle-representing image to which the piece of identification information (5) is assigned.

An alternative to the above may be configured so that when, after the desired height and width values of the check box are entered, the Save key 12e is tapped by the user and the touch panel 15 detects the tap, the control section 21 accepts the entered height and width values as post-change height and width of the check box. Alternatively, in place of user's entry of desired height and width values using the numeric keys and the like, the control section 21 may accept a change in size of the check box when the user drags the rectangle-representing image selected as the check box on the touch panel 15 to change the size of the image.

When the control section 21 determines that no selection request to specify the box as a check box has been accepted (NO in step S11), the processing goes back to step S5.

When the box information creating section 25 finishes the creation of a piece of box information, the control section 21 determines whether or not the creation of pieces of box information on all the boxes has been completed (step S12). When the control section 21 determines that the box information creating section 25 has not completed the creation of pieces of box information on all the boxes (NO in step S12), the processing goes back to step S5.

On the other hand, when the control section 21 determines that the box information creating section 25 has completed the creation of pieces of box information on all the boxes (YES in step S12), the control section 21 allows the storage section 19 to store, as a template T of the document image G1, the document image G1 and all the pieces of box information created by the box information creating section 25 (step S13).

Furthermore, the display control section 22 allows the display section 12 to display, in the template T, the standard box, the concatenated box, and the check box in different display manners. For example, when the box information creating section 25 creates a piece of box information on a box, the display control section 22 allows the display section 12 to display the box in a different display manner depending on the type of box. For example, as shown in FIG. 12, the display control section 22 allows each of the rectangle-representing images selected as standard boxes, i.e., the four rectangle-representing images to which the individual pieces of identification information (18), (27), (29), and (30) are assigned, to be displayed enclosed in a dashed-dotted rectangle. Furthermore, the display control section 22 allows each of the rectangle-representing images selected as concatenated boxes, i.e., the rectangle-representing image formed of three rectangles to which the individual pieces of identification information (14), (15), and (16) are assigned and the rectangle-representing image formed of four rectangles to which the individual pieces of identification information (19), (20), (21), and (22) are assigned, to be displayed enclosed in a dashed-two dotted rectangle. Moreover, the display control section 22 allows each of the rectangle-representing images selected as check boxes, i.e., the four rectangle-representing images to which the individual pieces of identification information (5), (6), (7), and (8) are assigned, to be displayed enclosed in a dotted rectangle. This display of boxes in different manners on the display section 12 is provided each time the box information creating section 25 creates a piece of box information on a box. For example, in an alternative to the above, the display control section 22 may allow different types of boxes to be displayed enclosed in different colored rectangles. Furthermore, the sub-boxes contained in each concatenated box may be displayed differently from sub-box to sub-box on the display section 12.

Thereafter, the control section 21 allows the communication section 16 to send, via the network 3 to the PC 1, the template T of the document image stored in the storage section 19 and an instruction signal that instructs to display an entry screen in which the document image contained in the template T, the rectangle-representing images specified as the boxes, and the respective pieces of identification information assigned to the rectangle-representing images are associated (step S14). Furthermore, the control section 21 allows the above instruction signal to contain an instruction signal that instructs to display, on the entry screen displayed on the display section 82 of the PC 1, the boxes in the template T in different display manners depending on the type of box.

Subsequently, in the PC 1, it is determined whether or not the acceptance section 73 has accepted the template T and the instruction signal through the sending/receiving section 83 from the image forming apparatus 2 (step S15). When the template T and the instruction signal have not been accepted (NO in step S15), the PC 1 stands by.

On the other hand, when the acceptance section 73 accepts the template T and the instruction signal through the sending/receiving section 83 (YES in step S15), the control section 71 determines whether or not to start the creation of pieces of character data for entry to be entered in the boxes contained in the template T (step S16). For example, when the acceptance section 73 accepts the template T and the instruction signal, the control section 71 allows, through the display control section 72, the display section 82 to display an inquiry into whether or not to start the creation of pieces of character data for entry. When the operating section 81 has accepted no user's operation for instructing to start the creation of pieces of character data for entry (NO in step S16), the control section 71 allows the PC 1 to stand by.

When the operating section 81 accepts a user's operation for instructing to start the creation of pieces of character data for entry (YES in step S16), the display control section 72 allows the display section 82 to display, according to the instruction signal accepted by the acceptance section 73, the accepted template T in a manner shown as an example in FIG. 13 (step S17). The user operates the operating section 81 to run an application, such as a word processor, and create document data (pieces of character data for entry) using the application (step S18).

As shown in FIG. 13, the entry screen includes, in the case of the template T displayed on the display section 82, not only the document image but also the rectangle-representing images specified as boxes in step S5, the pieces of identification information assigned to the rectangle-representing images, and the selected types of the boxes. In other words, the entry fields (boxes) in which pieces of character data for entry are to be entered are displayed together with the pieces of identification information assigned to the rectangle-representing images corresponding to the boxes on the entry screen. Therefore, the user can easily create document data to be entered into the boxes while recognizing the boxes.

For example, the user runs an application, such as a word processor or a spreadsheet, on the PC 1 and uses the application to create a data file D in a predetermined format. The user creates the data file D formed of an array as shown as an example in FIG. 14 by entering and arranging numerals and "characters for entry" in the array specified by the format through the operation of the operating section 81 using the application. In this data file D, numbers representing the above pieces of identification information are placed at respective predetermined positions. Furthermore, numerical values or characters serving as a piece of character data for entry are placed a predetermined number of spaces from each of the positions of the pieces of identification information. Since the pieces of identification information and pieces of character data for entry are placed in this manner, the image processing section 27 and so on of the image forming apparatus 2 can read out the pieces of identification information and pieces of character data for entry from the data file D. The data file D is stored in a region "Form Application" 84a of the storage section 84.

For example, as shown in FIG. 14, "777" is entered, as a piece of character data for entry for a standard box corresponding to a rectangle-representing image, next to the position allocated to the piece of identification information (18).

Furthermore, when the pieces of identification information (14), (15), and (16) are those for a concatenated box, pieces of character data for entry to be entered as those for the concatenated box into the respective sub-boxes are placed in series with predetermined delimiters (for example, ",") in between, next to the position allocated to the piece of identification information (14). For example, in the example shown in FIG. 14, the pieces of character data for entry in units of sub-boxes are "07", "25", and "2016" and "07, 25, 2016" is placed next to the piece of identification information (14).

Moreover, when the piece of identification information (5) is one for a check box, "x" is placed, as a piece of character data for entry for the check box, next to the position allocated to the piece of identification information (5).

Thereafter, when in the PC 1 the data file D is selected, as a target to be sent to the image forming apparatus 2, from the region "Form Application" 84a of the HDD 84 by the user's operation of the operating section 81, the print job creating section 74 creates a print job using the selected data file D (step S19).

Figure 15:
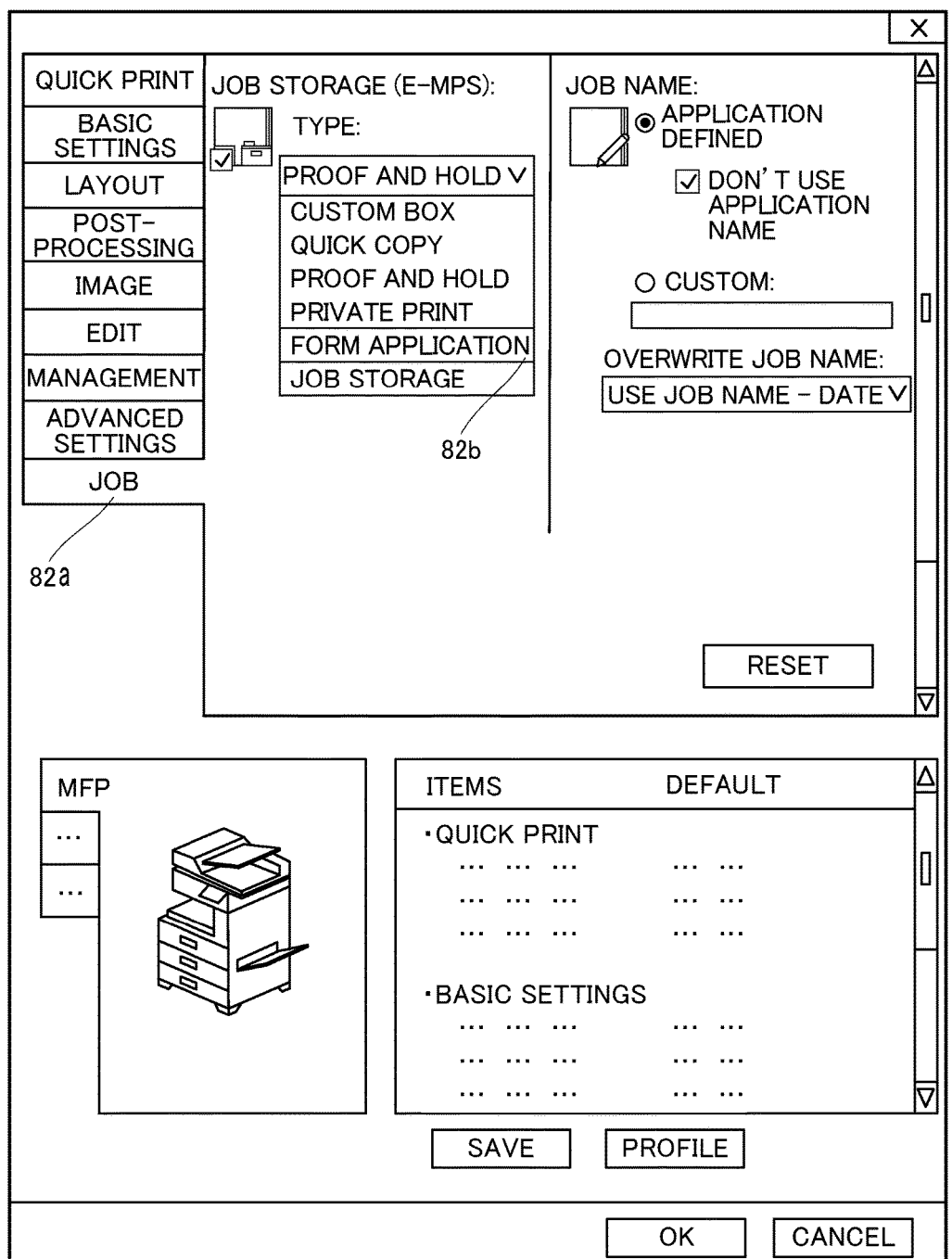
FIG. 15 is a view showing an example of another display screen displayed on the display section of the PC.

For example, when the user operates the operating section 81 to run a printer driver, the display control section 72 allows the display section 82 to display an entry screen in which a Job tab 82a is selected, as illustrated in FIG. 15. Then, when the user operates the operating section 81 to select an item "Form Application" 82b on the entry screen and further select the data file D from the region "Form Application" 84a of the HDD 84, the print job creating section 74 converts the data file D to previously described print data suitable for the image forming apparatus 2 (data converted to a format based on a printer language suitable for the image forming apparatus 2) and creates a print job for print processing containing this print data.

In doing so, the print job creating section 74 converts only pieces of character data for entry in the data file D to print data. As for the pieces of identification information, the print job creating section 74 adds to the pieces of identification information a piece of information indicating a correspondence relationship to the pieces of character data for entry and incorporates the resultant set of information, as separate data, into the print job. Specifically, in this print job, the pieces of identification information (5), (6), . . . , (29), and (30) in the data file D shown in FIG. 14 are not converted to print data and only the pieces of character data for entry are converted to data for printing on the image forming apparatus 2.

Subsequently, the control section 71 allows the sending/receiving section 83 to send, via the network 3 to the image forming apparatus 2, the print job that contains the pieces of character data for entry to be entered in the boxes and the above separate data (step S20).

In the image forming apparatus 2, the control section 21 determines whether or not the entry character data acquisition section 26 has received the print job through the communication section 16 from the PC 1 (step S21). Until the entry character data acquisition section 26 receives the print job (NO in step S21), the control section 21 allows the image forming apparatus 2 to stand by.

On the other hand, when the entry character data acquisition section 26 receives the print job through the communication section 16 from the PC 1 (YES in step S21), the control section 21 allows the storage section 19 to store, as an entry data file, the pieces of character data for entry and the separate data (containing the pieces of identification information) contained in the print job (step S22). In the storage section 19, as shown in FIG. 16, entry data files are stored in an entry data file region 19b and templates T, each containing a document image G acquired from reading by the image reading section 17 and pieces of box information created by the box information creating section 25, are stored in a template region 19a. The characters in the template T shown in FIG. 16 should have been same in the respective parts in FIG. 7. Because the template T is illustrated relatively smaller in FIG. 16, black dots are used in place of the respective characters.

According to a user's operation of the operation acceptance section, the display control section 22 allows the display section 12 to display the list of templates T and the list of entry data files both stored in the storage section 19 (step S23). For example, the display control section 22 allows the display section 12 to display a display screen shown in FIG. 17.

Thereafter, the control section 21 determines whether or not one of the templates and one of the entry data files have been selected by user's operating instructions to the operating section 14 (step S24). When one template and one entry data file have not been selected (NO in step S24), the image forming apparatus 2 stands by.

On the other hand, when the control section 21 detects that one template and one entry data file have been selected (YES in step S24), the control section 21 allows the image processing section 27 to execute synthesis processing using the selected template and entry data file (step S25).

For example, in the execution of step S24, the display control section 22 allows the display section 12 to display the display screen shown as an example in FIG. 17. When the user taps an item of "Payment Form" from a menu 12j showing a list of templates on the display screen and the tap is detected by the touch panel 15, the control section 21 accepts the selection of "Payment Form" as a template. Furthermore, when the user taps an item of "Payment Form Info" from a menu 12k showing a list of entry data files on the touch panel 15 and the tap is detected by the touch panel 15, the control section 21 accepts the selection of "Payment Form Info" as an entry data file.

Moreover, when the user taps a Synthesize key 12l and the tap is detected by the touch panel 15, the control section 21 allows the image processing section 27 to execute synthesis processing using the selected "Payment Form" template and "Payment Form Info" entry data file.

In the synthesis processing, as shown in FIG. 18, the image processing section 27 reads out the "Payment Form" template T and the "Payment Form Info" entry data file I to be subjected to synthesis processing from the template region 19a (see FIG. 16) and the entry data file region 19b (see FIG. 16), respectively, of the storage section 19. Then, the image processing section 27 places, within the areas of rectangle-representing images that are present in a document image represented by the "Payment Form" template T and are specified as boxes indicated by pieces of identification information in the template T, pieces of character data for entry contained in the "Payment Form Info" entry data file I and associated with the same pieces of identification information as the pieces of identification information in the template T and synthesizes the rectangle-representing images and the images of the pieces of character data for entry to create a synthesis result image. Furthermore, the created synthesis result image is stored in the image memory 13 or the storage section 19.

For example, the image processing section 27 places, within the area of the rectangle-representing image specified as the box (selected as a standard box) indicated by the piece of identification information (27) in the "Payment Form" template T shown in FIG. 18, an image of "Taro Yamada" as the piece of character data for entry contained in the "Payment Form Info" entry data file I and associated with the same piece of identification information (27) and synthesizes both the images. The image processing section 27 determines, based on the above pieces of box information contained in the "Payment Form" template T, that the box indicated by the piece of identification information (27) is a standard box. The image processing section 27 determines, based on the piece of information contained in the above separate data and indicating the correspondence relationship between pieces of character data for entry and pieces of identification information, that the piece of character data for entry associated with the piece of identification information (27) is "Taro Yamada".

For another example, the image processing section 27 reads out "07, 25, 2016" as the pieces of character data for entry associated with the piece of identification information (14) partly identical with the pieces of identification information (14), (15), and (16) in the template T from the "Payment Form Info" entry data file I, places them within the areas of the three rectangle-representing images specified as the box (selected as a concatenated box) indicated by the pieces of identification information (14), (15), and (16), or more specifically, places "07" in the box associated with the piece of identification information (14), places "25" in the box associated with the piece of identification information (15), places "2016" in the box associated with the piece of identification information (16), and synthesizes the three rectangle-representing images serving as boxes with the images of the pieces of character data for entry. The image processing section 27 determines, based on the above pieces of box information contained in the "Payment Form" template T, that the box indicated by the pieces of identification information (14), (15), and (16) is a concatenated box. Furthermore, in this case, the image processing section 27 determines the pieces of character data for entry placed next to a piece of identification information having the lowest number in the series of pieces of identification information to be pieces of character data for entry for use in the synthesis, and places the numerical values "07", "25", and "2016" forming "07, 25, 2016", each numerical value delimited by ",", into the sub-boxes forming the concatenated box in increasing order from the sub-box corresponding to the piece of identification information of the lowest number.

For still another example, the image processing section 27 places an image of "x" as a piece of character data for entry within the area of the rectangle-representing image specified as the box (selected as a check box) indicated by the piece of identification information (5) and synthesizes both the images. The image processing section 27 determines, based on the above pieces of box information contained in the "Payment Form" template T, that the box indicated by the piece of identification information (5) is a check box. The image processing section 27 determines, based on the piece of information contained in the above separate data and indicating the correspondence relationship between pieces of character data for entry and pieces of identification information, that the piece of character data for entry associated with the piece of identification information (5) is "x".

Subsequently, as shown in FIG. 19, the display control section 22 allows the display section 12 to display a synthesis result image F created by the image processing section 27 (step S26).

Thereafter, the control section 21 determines whether or not there is a request to print out the above synthesis result image F (step S27). For example, when the control section 21 detects that a Print key 12n has been tapped on a display screen shown in FIG. 19 by the user, the control section 21 determines that there is a request to print out the synthesis result image F, and allows the image forming section 18 to execute processing for printing out the synthesis result image F (step S28).

On the other hand, when the control section 21 detects that the Save key 12e has been tapped by the user, the control section 21 determines that there is no request to print out the synthesis result image F at the present moment, and allows the storage section 19 to save the synthesis result image F (step S29).

In a general image processing apparatus, it is difficult to change the contents of a piece of character data for entry to be entered in the area of a rectangle-representing image serving as such an entry field described above. Specifically, in order for the user to change the contents of a piece of character data for entry, it is necessary to read a document in a new format in which the contents to be entered are changed, and create a new template. In addition, it is also necessary to read another document in which a piece of character data for entry corresponding to the change of the contents to be entered is described. As just described, in order for the user to change the contents of character data for entry, the user needs to allow this image processing apparatus to perform additional reading of the two types of documents.

Unlike the above, in this embodiment, in creating a template T, the rectangle extracting section 23 extracts rectangle-representing images from a document image acquired from reading by the image reading section 17 and detects the sizes and locations of the rectangle-representing images in the document image and the identification information assigning section 24 sequentially assigns pieces of identification information to the extracted rectangle-representing images. Furthermore, the display control section 22 allows the display section 12 to display the document image, the extracted rectangle-representing images, and the respective pieces of identification information assigned to the rectangle-representing images, in a form in which the document image, the rectangle-representing images, and the respective pieces of identification information area associated. Moreover, the box information creating section 25 creates pieces of box information on boxes by associating each of the rectangle-representing images specified as the boxes by specification requests, the size and location of the rectangle-representing image in the document image, and the piece of identification information assigned to the rectangle-representing image with each other. When the box information creating section 25 creates the piece or pieces of box information, the control section 21 allows the storage section 19 to store the document image and the piece(s) of box information in a form of a template containing the document image and the piece(s) of box information.

In this embodiment, since the image processing section 27 places, within the areas of rectangle-representing images that are present in a document image represented by a template T and are specified as boxes indicated by pieces of identification information in the template T, pieces of character data for entry contained in an entry data file and associated with the same pieces of identification information as the pieces of identification information in the template T and synthesizes the rectangle-representing images and the images of the pieces of character data for entry to create a synthesis result image, the user can easily make a print where desired characters and so on are placed at desired locations in the document image. Furthermore, by the above creation of a template T and a data file D, the user can easily change the locations of pieces of character data for entry in the document image and the contents of the pieces of character data for entry.

Specifically, in this embodiment, when the user wants to change the location, in a read document image, of a box where a piece of character data for entry is to be entered, the control section 21 reads out the document image contained in a template of the document image from the storage section 19 and recognizes a post-change box by processing of the document image made by the rectangle extracting section 23 and the identification information assigning section 24. Therefore, simply by subsequently allowing the box information creating section 25 to create a piece of box information meeting the post-change box, the location of the box where the piece of character data for entry is to be entered can be easily changed without additional reading of documents.

Hence, in this embodiment, unlike the conventional techniques, a piece of character data for entry can be easily synthesized with an image into which the piece of character data for entry is required to be entered.

The above description has been given of the case where the print job creating section 74 operable according to a printer driver is provided on the PC (information processing apparatus) 1 side. However, the present disclosure is sufficient if the entry character data acquisition section 26 of the image forming apparatus 2 acquires character data for entry created by the PC 1. For example, the present disclosure may have a configuration in which the entry character data acquisition section 26 acquires, as character data for entry, document data created by the PC 1 and a printer driver provided in the image forming apparatus 2 converts the acquired character data for entry to print data for print processing. In this case, the image forming apparatus 2 includes the print job creating section 74.

The structure and processing described in the above embodiment with reference to FIGS. 1 to 19 are merely illustrative of the present disclosure and the present disclosure is not intended to be limited to the above structure and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image processing apparatus comprising:
   a display section;
   an image reading section that includes a scanner and optically reads an image of a document through the scanner;
   an operation acceptance section that includes an operating section and a touch panel, the operating section and the touch panel accepting an operating instruction from a user;
   a storage section; and
   a control unit that includes a CPU, the CPU functioning, when executing an image processing program, as:
      a rectangle extracting section that extracts a rectangle-representing image representing a rectangle from the image of the document acquired from reading by the image reading section and detects a size and a location of the rectangle-representing image in the image of the document;
      an identification information assigning section that sequentially assigns a piece of identification information to the rectangle-representing image extracted by the rectangle extracting section;
      a display control section that allows the display section to display the image of the document and display on the image of the document the rectangle-representing image extracted by the rectangle extracting section;
      a box information creating section that, when the operation acceptance section accepts a specification request from the user to specify the rectangle-representing image being displayed on the display section as a box that is an entry field in which a piece of character data for entry is to be entered, creates a piece of box information on the box by associating the rectangle-representing image specified as the box by the specification request, the size and location of the rectangle-representing image in the image of the document, and the piece of identification information assigned to the rectangle-representing image with each other; and
      a control section that, when the box information creating section creates the piece of box information, allows the storage section to store the image of the document and the piece of box information in a form of a template containing the image of the document and the piece of box information,
   wherein when the operation acceptance section accepts, in addition to the specification request, a selection request from the user to select, as a type of the box specified by the specification request, one of a standard box in which at least one character is to be entered as the piece of character data for entry, a concatenated box in which a plurality of boxes each capable of accommodating the piece of character data for entry are concatenated as a single box, and a check box in which a predetermined check mark is to be entered as the piece of character data for entry, the box information creating section creates the piece of box information on the box by associating the rectangle-representing image specified as the box by the specification request, the size and location of the rectangle-representing image in the image of the document, the piece of identification information assigned to the rectangle-representing image, and the type of the box selected by the selection request with each other,
   when, after the operation acceptance section accepted the selection request to select the concatenated box, the operation acceptance section does not detect that a portion displaying a rectangle-representing image specified as the concatenated box has been tapped by the user within a predetermined period of time in which the control section accepts an instruction to specify a size of the concatenated box, the box information creating section creates a piece of box information of the concatenated box, and the box information of the concatenated box contains a piece of information indicating that a plurality of rectangle-representing images specified as the plurality of boxes contained in the concatenated box are sub-boxes into each of which a piece of character data for entry can be entered independently of the other sub-boxes.

2. The image processing apparatus according to claim 1, wherein when the box information creating section creates the piece of box information, the display control section allows the display section to display the box in a different display manner depending on the type of the box, and when the box information creating section creates the piece of box information of the concatenated box, the display control section allows the display section to display the plurality of sub-boxes contained in the concatenated box in a display manner different from other boxes.

3. The image processing apparatus according to claim 1, wherein after the operation acceptance section accepts the specification request to specify the box, the display control section allows the display section to provide a display for accepting an instruction to change a size of the box according to a user's selection operation on the operation acceptance section, and when the operation acceptance section accepts a value indicating a post-change size of the box, the control section allows the storage section to store the accepted value of the post-change size of the box as a size, in the image of the document, of the rectangle-representing image specified as the box, in a form of inclusion in the piece of box information.

4. The image processing apparatus according to claim 3, wherein in allowing the display section to provide the display for accepting the instruction to change the size of the box, the display control section allows the display section to display an image for accepting changes of height and width values of the box from the user.

5. An image forming apparatus comprising:

the image processing apparatus according to claim 1; and an image forming section that forms on a recording medium the image of the document acquired from reading by the image reading section, wherein the image forming section includes a photosensitive drum and an intermediate transfer belt and forms the image of the document on the recording medium by forming an electrostatic latent image on a surface of the photosensitive drum, developing the electrostatic latent image on the surface of the photosensitive drum into a toner image, transferring the toner image on the surface of the photosensitive drum to the recording medium through the intermediate transfer belt, and fixing the toner image on the recording medium.

6. The image processing apparatus according to claim 1, further comprising:

a communication section that transfers data to and from an information processing apparatus via a network;

an entry character data acquisition section that acquires, through the communication section via the network from the information processing apparatus, the piece of character data for entry to be entered in the box and the piece of identification information associated with the piece of character data for entry; and an image processing section, wherein the control section allows the storage section to store as an entry data file the piece of character data for entry and the piece of identification information associated with the piece of character data for entry, both acquired by the entry character data acquisition section, and the image processing section synthesizes, within an area of the rectangle-representing image that is present in the image of the document represented by the template and is specified as the box indicated by the piece of identification information contained in the template, the piece of character data for entry contained in the entry data file and associated with the same piece of identification information as the piece of identification information contained in the template to create a synthesis result image.

\* \* \* \* \*